United States Patent
Jones et al.

[11] Patent Number: 5,990,997
[45] Date of Patent: Nov. 23, 1999

[54] NW TWISTED NEMATIC LCD WITH NEGATIVE TILTED RETARDERS FOR IMPROVED VIEWING CHARACTERISTICS

[75] Inventors: Michael R. Jones, South Lyon; John A. VanderPloeg, Highland, both of Mich.

[73] Assignee: OIS Optical Imaging Systems, Inc., Northville, Mich.

[21] Appl. No.: 09/088,704

[22] Filed: Jun. 2, 1998

Related U.S. Application Data

[63] Continuation-in-part of application No. 08/869,973, Jun. 5, 1997, and application No. 08/876,043, Jun. 13, 1997, Pat. No. 5,895,106.

[51] Int. Cl.⁶ .......................... G02F 1/1335; G02F 1/1347
[52] U.S. Cl. ........................ 349/120; 349/118; 349/121
[58] Field of Search ...................... 349/117, 118, 349/119, 120, 121, 136; 359/494

[56] References Cited

U.S. PATENT DOCUMENTS

| | | |
|---|---|---|
| 5,430,565 | 7/1995 | Yamanouchi et al. . |
| 5,504,603 | 4/1996 | Winker et al. . |
| 5,557,434 | 9/1996 | Winker et al. . |
| 5,559,618 | 9/1996 | Mori . |
| 5,570,214 | 10/1996 | Abileah et al. . |
| 5,576,861 | 11/1996 | Abileah et al. . |
| 5,583,677 | 12/1996 | Ito et al. . |
| 5,583,679 | 12/1996 | Ito et al. . |
| 5,589,963 | 12/1996 | Gunning, III et al. . |
| 5,594,568 | 1/1997 | Abileah et al. . |
| 5,612,801 | 3/1997 | Winker . |
| 5,619,352 | 4/1997 | Koch et al. . |
| 5,638,200 | 6/1997 | Xu ........................................... 349/117 |
| 5,777,709 | 7/1998 | Xu ........................................... 349/120 |
| 5,859,681 | 1/1999 | VanderPloeg et al. .................. 349/120 |

*Primary Examiner*—James A. Dudek
*Assistant Examiner*—Tai V. Duong
*Attorney, Agent, or Firm*—Joseph A. Rhoa

[57] ABSTRACT

A normally white (NW) twisted nematic (TN) liquid crystal display (LCD) outputs improved viewing characteristics which are defined by high contrast ratios and/or reduced inversion. The display includes a pair of negative tilted retarders located on opposite sides of the liquid crystal layer, each of the tilted retarders including a tilt or incline angle which varies throughout the thickness of the layer. Additionally, one or two negative uniaxial or biaxial retarders may also be provided on opposite sides of the LC layer. As a result of the particular orientations, alignments, and retardation values described in different embodiments herein, the display exhibits improved contrast and/or reduced inversion, often in the same viewing areas.

16 Claims, 14 Drawing Sheets

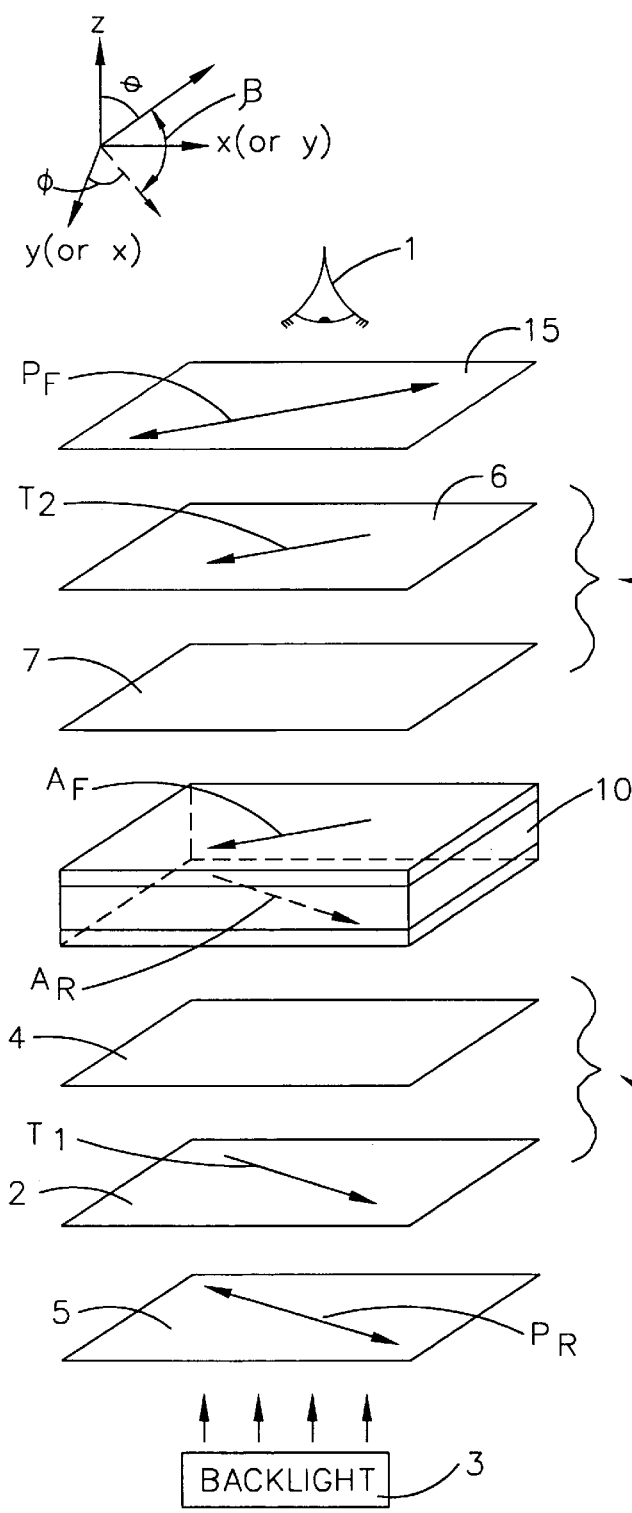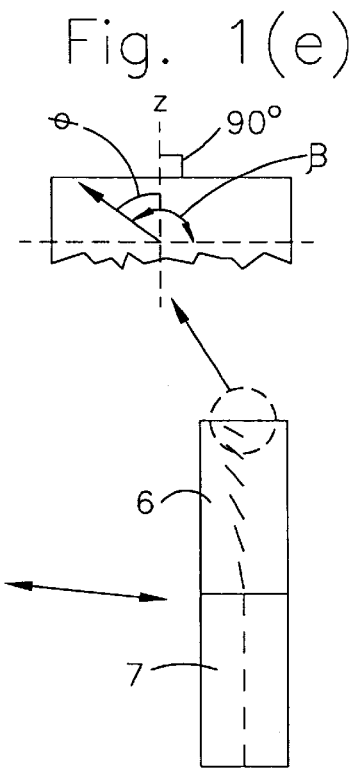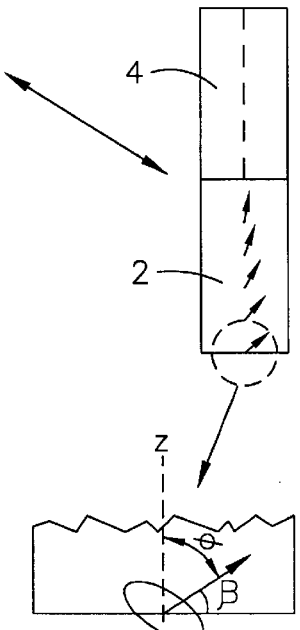
Fig. 1(a) Fig. 1(b) Fig. 1(c) Fig. 1(d) Fig. 1(e)

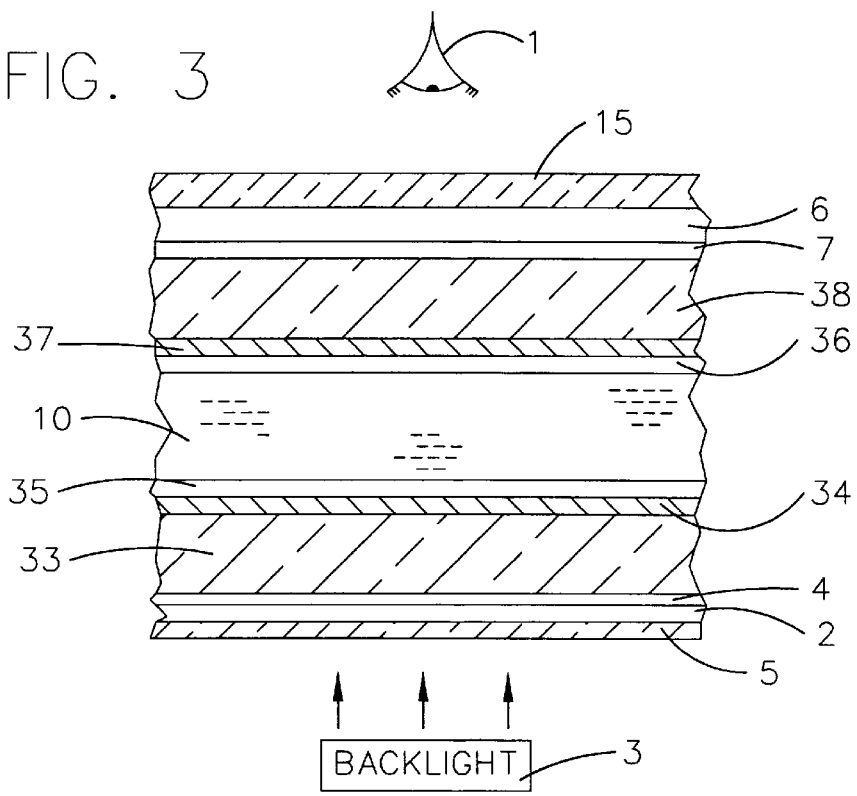
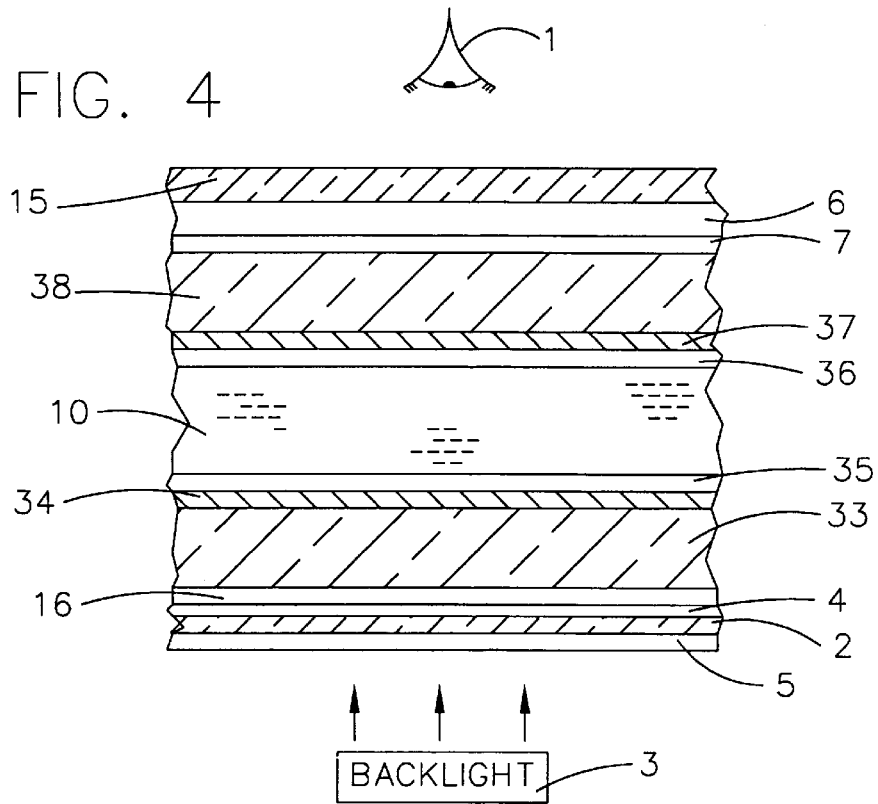

NW TWISTED NEMATIC LCD WITH NEGATIVE TILTED RETARDERS FOR IMPROVED VIEWING CHARACTERISTICS

This application is a continuation-in-part (CIP) of each of 08/869,973, filed Jun. 5, 1997 still pending, and 08/876,043, filed Jun. 13, 1997, U.S. Pat. No. 5,895,106, the disclosures of which are hereby incorporated herein by reference.

This invention relates to a normally white (NW) liquid crystal display (LCD) including tilted and negative optical compensators or retarders. More particularly, this invention relates to a NW twisted nematic (TN) LCD including first and second tilted retarders arranged in an LCD in a manner so as to provide improved contrast and/or shift high contrast to a non-inverting gray scale viewing region.

RELATED APPLICATIONS

This application is related to commonly owned U.S. Pat. Nos. 5,576,861; 5,594,568; and 5,570,214; and U.S. Ser. Nos. 08/559,275, filed Nov. 15, 1995; 08/711,797, filed Sept. 10, 1996, and 08/768,502, filed Dec. 18, 1996, the entire disclosures of which are all hereby incorporated herein by reference. Each of these commonly owned applications and/or patents relates to a liquid crystal display with specific retarder values, contrast ratios, retarder positions or orientations, and/or retarder types.

BACKGROUND OF THE INVENTION

Contrast ratio (CR) is one of the most important attributes considered in determining the quality of both normally white (NW) and normally black (NB) LCDs. The contrast ratio (CR) in a normally white display is determined in low ambient conditions by dividing the "off-state" light transmission (high intensity white light) by the "on-state" or darkened transmitted intensity. For example, if the "off-state" transmission is 200 fL at a particular viewing angle and the "on-state" transmission is 5 fL at the same viewing angle, then the display's contrast ratio at that particular viewing angle is 40 (or 40:1) for the particular driving voltages utilized.

Accordingly, in normally white LCDs, a significant factor adversely limiting contrast ratio is the amount of light which leaks through the display in the darkened or "on-state." In a similar manner, in normally black displays, a significant factor limiting the contrast ratio achievable is the amount of light which leaks through the display in the darkened or "off-state." The higher and more uniform the contrast ratio of a particular display over a wide range of viewing angles, the better the LCD in most applications.

Normally black (NB) twisted nematic displays typically have better contrast ratio contour curves or characteristics than do their counterpart NW displays (i.e. the NB image can often be seen better at large or wide viewing angles). However, NB displays are optically different than NW displays and are much more difficult to manufacture due to their high dependence on the cell gap or thickness "d" of the liquid crystal layer as well as on the temperature of the liquid crystal (LC) material itself. Accordingly, a long-felt need in the art has been the ability to construct a normally white (NW) display with high contrast ratios over a large range of viewing angles, rather than having to resort to the more difficult and expensive to manufacture NB displays in order to achieve these characteristics.

What is often needed in NW LCDs is an optical compensating or retarding element(s), i.e. retardation film(s), which introduces a phase delay that restores the original polarization state of the light, thus allowing the light to be substantially blocked by the output polarizer (analyzer) in the "on-state." Optical compensating elements or retarders are known in the art and are disclosed, for example, in U.S. Pat. Nos. 5,184,236; 5,189,538; 5,406,396; 4,889,412; 5,344,916; 5,196,953; 5,138,474; and 5,071,997.

The disclosures of U.S. Ser. No. 08/559,275; and U.S. Pat. Nos. 5,570,214 and 5,576,861 (all incorporated herein by reference) in their respective "Background" sections illustrate and discuss contrast ratio, and driving voltage versus intensity (fL) graphs of prior art NW displays which are less than desirable. Many prior art NW LCD viewing characteristics are problematic in that, for example, their contrast ratios are limited horizontally and/or vertically (and are often non-symmetric), and their gray level performance lacks consistency.

Gray level performance, and the corresponding amount of inversion, are also important in determining the quality of an LCD. Conventional active matrix liquid crystal displays (AMLCDs) typically utilize anywhere from about 8 to 64 different driving voltages. These different driving voltages are generally referred to as "gray level" voltages. The intensity of light transmitted through the pixel(s) or display depends upon the driving voltage utilized. Accordingly, conventional gray level voltages are used to generate dissimilar shades of color so as to create different colors and images when, for example, the shades are mixed with one another.

Preferably, the higher the driving voltage in a normally white display, the lower the intensity (fL) of light transmitted therethrough. The opposite is true in NB displays. Thus, by utilizing multiple gray level driving voltages, one can manipulate either a NW or NB LCD to emit desired intensities and shades of light/color. A gray level voltage $V_{ON}$ is generally known as any driving voltage greater than $V_{th}$ (threshold voltage) up to about 3.0 to 6.5 volts, although gray level voltages may be as low as 2.0 in certain applications.

Gray level intensity in an LCD is dependent upon the display's driving voltage. It is desirable in NW displays to have an intensity versus driving voltage curve for as many viewing angles as possible wherein the intensity of light emitted from the display or pixel continually decreases as the driving voltage increases. Such desired gray level curves across a wide range of view allows the intensity of light reaching viewers at different viewing angles to be easily and consistently controlled. It is also desirable that all such curves have as close to the same slope as possible.

U.S. Pat. No. 5,583,679 (the disclosure of which is incorporated herein by reference) discloses an LCD including an optical compensating sheet that includes a discotic structure and negative birefringence, with the discotic structure unit having an inclined plane. Unfortunately, the contrast ratios and inversion characteristics resulting from displays of the '679 patent have been found by the instant inventors to be less than desirable. Certain embodiments of the instant invention described herein exhibit surprisingly improved results with respect to contrast ratio and/or inversion as compared to the '679 patent.

It is apparent from the above that there exists a need in the art for a normally white TN liquid crystal display (LCD) wherein the viewing zone of the display has high contrast ratios and/or little or no inversion over a wide range of viewing angles. Furthermore, there exists a need in the art for improved contrast and reduced inversion in the same viewing zone (e.g. in the upper vertical viewing zone principally utilized by pilots of aircraft in avionic applications).

The term "rear" when used herein as it is used to describe substrates, polarizers, electrodes, buffing films or zones, retarders, and orientation films means that the described element is on the backlight side of the liquid crystal material, or in other words, on the side of the LC material opposite the viewer.

The term "front" when used herein but only as it is used to describe substrates, polarizers, retarders, electrodes, buffing films or zones and orientation films means that the described element is located on the viewer side of the liquid crystal material.

Unless otherwise specified, the actual LCDs and light valves made and/or tested herein included a liquid crystal material with a birefringent value ($\Delta n$) of 0.0854 at room temperature, Model No. ZLI-4718 obtained from Merck.

Unless otherwise specified, the term "retardation value" as used herein for uniaxial retarders means "d $\Delta n$" of the retardation film or plate, where "d" is the film or plate thickness and "$\Delta n$" is the film birefringence (i.e. difference in certain indices of refraction).

The term "interior" when used herein to describe a surface or side of an element (or an element itself), means that closest to the nematic liquid crystal (LC) material. The term "exterior" means the side farthest from the nematic liquid crystal layer.

The term "light valve" as used herein means a liquid crystal display including a rear linear polarizer, a rear transparent substrate, a rear continuous pixel electrode, a rear orientation film, an LC layer, a front orientation film, a front continuous pixel electrode, a front substrate, and a front linear polarizer (i.e. without the presence of color filters and/or active matrix driving circuitry such as TFTs). Such a light valve may also include retardation film(s) disposed on either side of the LC layer as described with respect to each example and/or embodiment herein. In other words, a "light valve" (LV) may be referred to as one giant pixel without segmented pixel electrodes.

For all circular grid contrast ratio graphs herein, "EZContrast" equipment available from Eldim of Caen, France (ID #204F) was used to develop these graphs. This equipment includes a system for measuring Luminance and Contrast versus viewing angle (incident (polar) and azimuth angle), utilizing 14 bits A/D conversion to give luminance measurements from $\frac{1}{10}$ to 8,000 cd/m$^2$, with an accuracy of 3% and a fidelity of 1%. A temperature regulated CCD sensor with a photopic response (and specially designed lenses) are part of this commercially available Eldim system and corresponding software. The measurement device of this Eldim system includes a specially designed large viewing angle lens system having a numerical aperture of 0.86. The Eldim software is Windows™ 3.1 based, running on any 486 and above PC, supporting DDE interface with other programs.

All measured real data herein, in the Examples, included the non-uniform characteristics of the backlight over a range of angles. Backlights are more intense at normal than at wide angles.

SUMMARY OF THE INVENTION

In certain preferred embodiments, the azimuthal angles $\phi$ of each of the first and second tilted retardation layers remain substantially fixed (i.e. do not vary more than about 10°, preferably no more than 5°, and most preferably substantially zero degrees of variation) throughout the thickness of the layers, while the polar or incline angles ($\beta$ or $\theta$) of negative tilted retarders vary either continuously or intermittently through the thickness of tilted retarders herein.

In certain embodiments, the display further includes first and second negative retardation layers, (e.g. TAC layers), each of the first and second negative retardation layers being defined by one of: (i) $n_x > n_y > n_z$; and (ii) $n_x = n_y > n_z$, where the $n_z$ optical axis (i.e. index of refraction for the extraordinary mode) is normal to the plane of the retarder. These first and second layers may be non-tilted.

In certain embodiments, each tilted retarder has a retardation value d·($n_e - n_o$) of from about −20 to −200 nm, and preferably from about −50 to −150 nm, and most preferably from about −70 to −150 nm. The value "d" or thicknesses is the thickness measured in the direction normal to the plane of the film.

This invention will now be described with respect to certain embodiments thereof, along with reference to the accompanying illustrations, wherein:

BRIEF DESCRIPTION OF THE DRAWINGS

FIG. 1(a) is a schematic diagram of the optical components of a normally white (NW) twisted nematic (TN) liquid crystal display (LCD) including first and second negative tilted retarders and first and second negative non-tilted retarders according to an embodiment of this invention.

FIG. 1(b) is a schematic diagram illustrating the tilted characteristics of the rear tilted retarder and the non-tilted characteristics of the rear negative non-tilted retarder.

FIG. 1(c) is an enlarged schematic illustrating the tilted characteristic (via tilt angles $\theta$ and $\beta$) of the molecules and optical axes in the rear tilted retarder on the exterior side of thereof.

FIG. 1(d) is a schematic diagram illustrating the tilted characteristics of the front tilted retarder and the non-tilted characteristic of the front negative non-tilted retarder.

FIG. 1(e) is an enlarged schematic illustrating the tilted characteristic (via tilt angles $\theta$ and $\beta$) of the molecules and optical axes in the front tilted retarder on the exterior side thereof.

FIG. 3 is a side cross-sectional view of an NW twisted nematic LCD according to the FIGS. 1–2 embodiment.

FIG. 4 is a side cross-sectional view of an NW twisted nematic LCD according to another embodiment of this invention.

In FIG. 14, at the 0° angle, a measuring laser beam is striking the retarder from a direction normal to (i.e. perpendicular to) the plane of the retarder system, and at the peak of the curve (e.g. at about negative 30–37 degrees) the laser beam is being directed at the retarder system in a direction approximately parallel to the average optical axis tilt direction of the retarder system.

DETAILED DESCRIPTION OF CERTAIN EMBODIMENTS OF THIS INVENTION

Figure 2A:
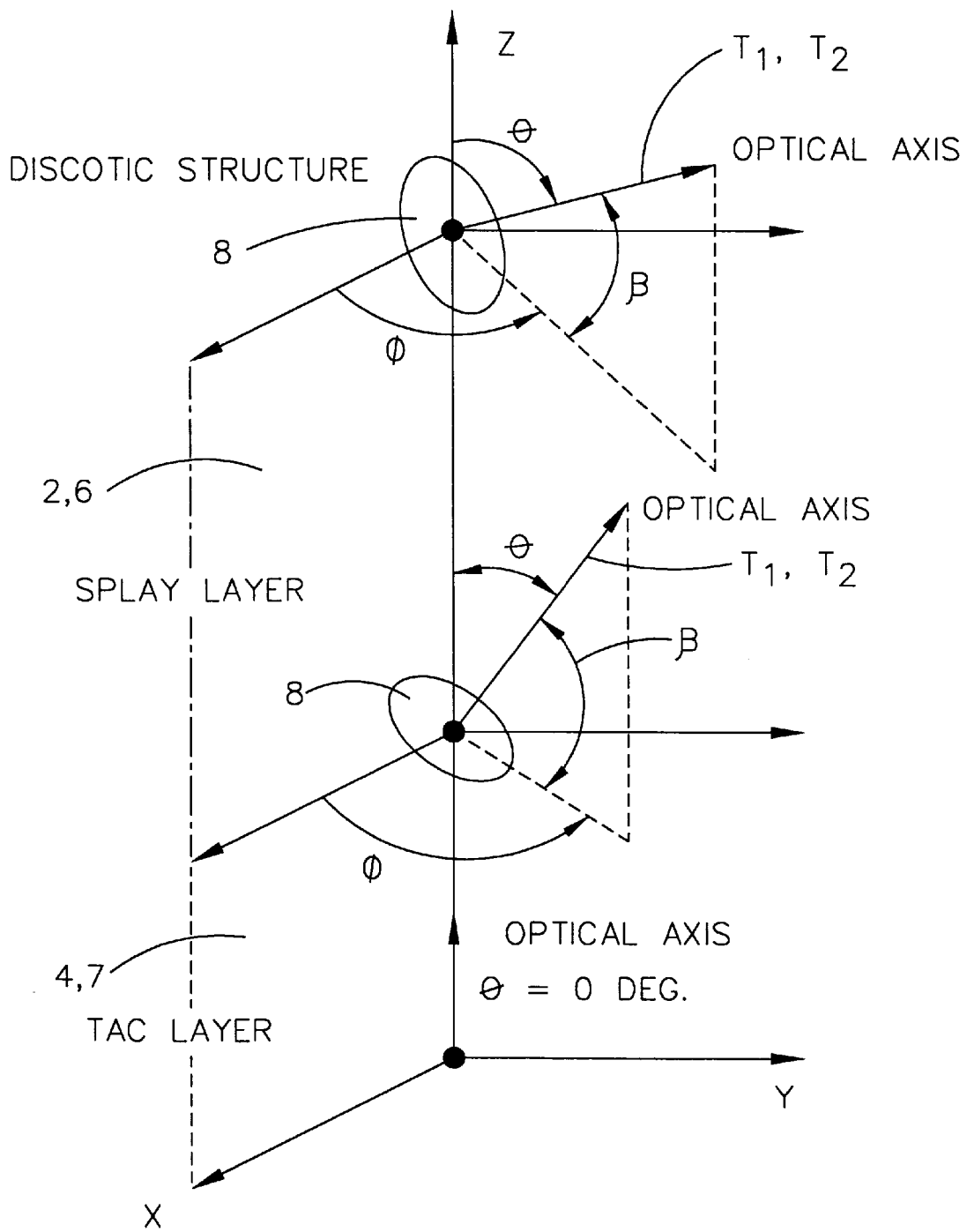
FIG. 2(a) is an optical diagram defining azimuthal angle $\phi$ and tilt angles $\theta$ and $\beta$ for the FIG. 1(a)–1(e) embodiment and other embodiments herein.

Referring now more particularly to the accompanying drawings in which like reference numerals indicate like parts throughout the several views.

FIG. 1(a) is an exploded schematic view of the optical components, and their respective azimuthal φ orientations, of a twisted nematic (TN) NW LCD according to a first embodiment of this invention, this LCD being either a light valve (LV) or an AMLCD having a matrix array of pixels and colored (e.g. RGB, RGBG, RGGB, or RGBW) subpixels therein. As shown, this display includes from the rear forward toward viewer 1, conventional backlight 3, rear or light-entrance linear polarizer 5, first rear tilted negative retarder 2, first rear negative retarder 4 (which may be either uniaxial or biaxial, including indices of refraction $n_x$, $n_y$, and $n_z$), rear tilt sense or direction $A_R$ which shows the tilt sense of the liquid crystal molecules adjacent the rear LC orientation layer, twisted nematic (TN) liquid crystal (LC) layer 10, front tilt sense or direction $A_F$ which shows the tilt sense of the LC molecules of layer 10 adjacent the front LC orientation film, front negative retarder 7 which may be uniaxial or biaxial, front tilted negative retarder 6, and finally front or light-exit linear polarizer 15 (analyzer). The LCD or LV of FIG. 1(a) is viewed by viewer 1.

Glass substrates (discussed below) are located on opposite sides of nematic liquid crystal layer 10 so as to be disposed, for example, between the respective orientation films and their adjacent polarizers. Driving electrodes are disposed on and between the substantially transparent substrates and their adjacent orientation layers.

A key to our invention is the surprise finding that when negative tilted retarders 2 and 6 and negative retarders 4 and 7 (which may be tilted or non-tilted) are placed on opposite sides of the LC layer 10 and are within a particular retardation value(s) range and/or ratio, have their tilt sense oriented in a certain manner, and/or are arranged in predetermined positions in the LCD, improved viewing characteristics of the display result. For example, the viewing characteristics of the LCD with respect to contrast ratio is wider/larger, while inversion is lessened, both in a particular viewing zone in some embodiments such as the positive vertical zone which is so important to aircraft pilots.

Retarders 2, 4, 6, and 7 are said to be "negative" as refractive index $n_z$ in each of them is less than both indices $n_x$ and $n_y$ (i.e. negative birefringence). Indices of refraction $n_x$ and $n_y$, while being co-planar, are oriented at a 90° angle relative to one another in, for example, the plane(s) of the respective film(s). Index of refraction $n_z$ is perpendicular to the plane defined by the $n_x$ and $n_y$ directions (i.e. the $n_z$ direction in certain embodiments may be normal to the film plane(s) and in other embodiments may not). For negative uniaxial or slightly biaxial retarders 4 and 7, indices $n_x$ and $n_y$ typically define a plane co-planar with the retarder layers. However, for tilted retarders 2 and 6, the plane defined by $n_x$ and $n_y$ is usually tilted relative to the plane of the overall layer because, for example, the $n_x$, $n_y$ plane is parallel to or co-planar with the plane of the discotic molecules of the tilted retarder layers in certain embodiments. Thus, in retarders 2 and 6, the $n_z$ optical axis or index is not perpendicular to the plane of the layer, but instead is tilted relative thereto.

Negative (when non-tilted) retarders 4 and 7 each have a retardation value $d\cdot(n_x-n_z)$ of from about +10 to +150 nm (preferably from about +10 to +80 nm), and a retardation value $d\cdot(n_x-n_y)$ of from about −20 to +20 nm, in certain embodiments [where "d" is the thickness of the retarder or compensator]. Thus, when $d\cdot(n_x-n_y)=0$ nm (or approximately zero), these retarders 4 and 7 are negative uniaxial retarders and when refractive index $n_x$ is substantially greater or less than refractive index $n_y$ they are biaxial negative retarders (they are "negative" because $n_z$ is less than each of $n_x$ and $n_y$). Retarders 4 and 7 may be made, for example, of triacetyl cellulose (TAC) [i.e. cellulose triacetate film] having a thickness of about 80–140 μm (more preferably of from about 90–120 μm, and most preferably about 100 μm) or of any of the other materials disclosed in U.S. Pat. No. 5,583,679, incorporated herein by reference. Each of these retarders may also include or be supplemented by a thin gelatin alignment layer thereon (0.1 μm) and/or a polyvinyl alcohol coating solution which is rubbed as discussed in the '679 patent. Alternatively, retarders 4 and 7 may be uniaxial C-plate made of a polyimide. This alignment layer is located between, for example, layers 2 and 4 and aligns molecules of the tilted retarder layer 2.

Negative tilted anisotropic optical retarders or compensators 2 and 6 (e.g. made of a compound having a discotic structure unit in its molecule such as a discotic liquid crystalline compound having low molecular weight such as monomer and a polymer obtained by polymerization of a polymeric discotic LC compound) have tilted optical axes $T_1$ and $T_2$, respectively (the azimuthal angles φ of optical axes $T_1$ and $T_2$, defined as the axes project in the plane of the respective films, are shown in FIG. 1(a)). Each discotic negative retarder 2 and 6 is from about 1.5 to 3.0 μm thick (preferably about 2.0 μm thick) according to certain embodiments of this invention. Because each of optical axes $T_1$ and $T_2$ are angled relative to both the vertical and horizontal, each defines both a polar angle (i.e. tilted or inclined angle θ) which is the angle defined between (i) the direction normal to the disc-like molecules of the retarder, and (ii) the direction normal to the display; and an azimuth angle φ which is the direction of axis $T_1$, $T_2$ of the optical axis of a retarder in the $n_x$, $n_y$, plane or the plane of the film, as viewed from the point of view of viewer 1, as shown, for example, in FIGS. 2(a) and 2(b). It is noted that because the plane defined by discotic molecules in the tilted retarders varies along with tilt angle θ, the $n_x$, $n_y$ plane also varies in tilted retarders herein. According to certain embodiments, the polar angle θ of each of tilted retarders 2 and 6 varies (either continuously or intermittently in either direction) throughout the thickness of the film while the azimuthal angle φ remains substantially constant in the film. For example, the tilt angle θ of one or both of retarders 2 and 6 may vary continuously from about 5° to 65° through the thickness of the layer. In certain embodiments, the inclined or polar angle θ varies within the range of from 5° to 85° (preferably from about 10° to 80°) while the minimum polar angle θ in the film (at the side of the film closest to LC layer 10) is in the range of from about 0° to 85° (preferably from about 1° to 10°) and the maximum polar angle θ is (at the side of the film 2, 6 located furthest from LC layer 10) from about 5° to 90° (preferably from about 45° to 70°). See U.S. Pat. No. 5,583,679 (the disclosure of which is incorporated herein by reference) for exemplary embodiments of tilted films 2 and 6. Preferably, tilted retarders 2 and 6 are oriented on opposite sides of LC layer 10, although that need not be the case in all embodiments.

In certain preferred embodiments of this invention, it has been found that improved results are obtained by orienting tilted retarders 2 and 6 so that the light from backlight 3 hits the high tilt angle θ side of rear tilted retarder 2 first, travels through retarder 2 and LC layer 10, exits the LC layer 10 and then first hits the low tilt angle θ side of front tilted retarder 6 and exits retarder 6 on the high tilt angle θ side thereof [see FIGS. 1(b)–1(e)].

A "negative" retarder means that $n_e < n_o$. As known in the art, refractive index $n_z$ (i.e. optical axis) in a negative uniaxial retarder is equal to refractive index $n_e$ in such a retarder. In slightly biaxial retarders when $n_x$ is proximate to but not exactly equal to $n_y$ (e.g. $n_x$=1.57 and $n_y$=1.59), then $n_o$ may be considered equal to either $n_x$ or $n_y$ as such retarders, although slightly biaxial, are essentially uniaxial in nature ($n_e$ is considered the $n_z$ index in such biaxial retarders also).

Tilted negative retarders 2 and 6 each include refractive indices $n_x$, $n_y$, and $n_z$, and thus extraordinary refractive index $n_e$ for the optical axis of symmetry of the discotic molecule structure, and ordinary refractive index or axis $n_o$ which is perpendicular to ne as known in the art. According to certain embodiments of this invention, each of retarders 2 and 6 has an $n_e$ (and $n_z$) of from about 1.40 to 1.65, preferably from about 1.45 to 1.60, most preferably about 1.54, and an $n_o$ (and $n_x$ and/or $n_y$) of from about 1.45 to 1.70, preferably from about 1.5 to 1.6, and most preferably from about 1.57 to 1.58. Also, each of retarders 2 and 6 has a thickness of from about 1.5 to 3.0 μm (preferably about 2.0 μm), and a Δn (i.e. $n_e-n_o$) value of from about −0.30 to +0.20, preferably from about −0.20 to +0.10, and most preferably from about −0.10 to 0.0.

Rear retarders 2 and 4 may be laminated or otherwise formed together as one unit as discussed in the '679 patent, as may front retarders 6 and 7. An orientation or alignment layer may be provided between layers 2 and 4 (and between layers 6 and 7) to align the discotic molecules of the tilted retarders.

Retarders 2, 4, and 6, 7 may be obtained from Fuji Photo Film Co., Ltd., Japan, as WV-film.

Backlight 3 is conventional in nature and emits substantially collimated, or alternatively diffused (in Examples herein), light toward the display panel. Backlight 3 may be, for example, the backlighting assembly disclosed in U.S. Pat. No. 5,161,041, the disclosure of which is hereby incorporated herein by reference. Other conventional high intensity substantially collimated or diffuse backlight assemblies may also be used.

Rear and front polarizers, 5 and 15 respectively, may be iodine based absorption and linear in nature according to certain embodiments of this invention, and their respective linear transmission axes $P_R$ and $P_F$ are oriented perpendicular to one another (i.e. about 90° from one another±about 10° (substantially perpendicular) in either direction) so that LCDs and LVs of the different embodiments of this invention are of the normally white (NW) twisted nematic (TN) type. Therefore, when a driving voltage (e.g. 0.0 or 0.1 V) below the threshold voltage $V_{th}$ is applied by the opposing electrodes across liquid crystal (LC) layer 10, transmission axes $P_R$ and $P_F$ of polarizers 5 and 15, respectively, are oriented such that the light emitted from backlight 3 proceeds through and is linearly polarized in direction $P_R$ by rear polarizer 5, is then twisted (e.g. from about 80° to 100°, preferably about 90°) by twisted nematic LC layer 10, and finally exits front polarizer or analyzer 15 via transmission axis $P_F$ thus reaching viewer 1 with an image. The light reaches viewer 1 because its polarization direction upon reaching front polarizer 15 is similar to the direction defined by transmission axis $P_F$. Thus, a NW display or pixel to which a voltage less than $V_{th}$ is applied is said to be in the "off-state" and appears white (or colored if color filters are present) to the viewer. These conventional polarizers 5 and 15 are commercially available from, for example, Nitto Denko America, as #G1220DUN.

However, when a substantial driving voltage (i.e. gray level voltage or full voltage greater than the threshold voltage $V_{th}$) is applied across the LC of selected NW pixels of the LCD matrix array, the light transmitted through rear polarizer 5 is not twisted as much by LC layer 10 and thus is at least partially blocked by front polarizer 15 due to the fact that the polarization direction of light reaching the interior surface of front polarizer 15 is substantially perpendicular (or otherwise non-aligned) to transmission axis $P_F$, thereby resulting in substantially no, or a lessor amount of, light reaching viewer 1 by way of the selected pixel(s) to which the substantial driving voltage (e.g. from about 3.0–6.5 volts) is applied. Thus, driven pixels in the LCD appear darkened to viewer 1, these pixels said to be in the "on-state."

Figure 2B:
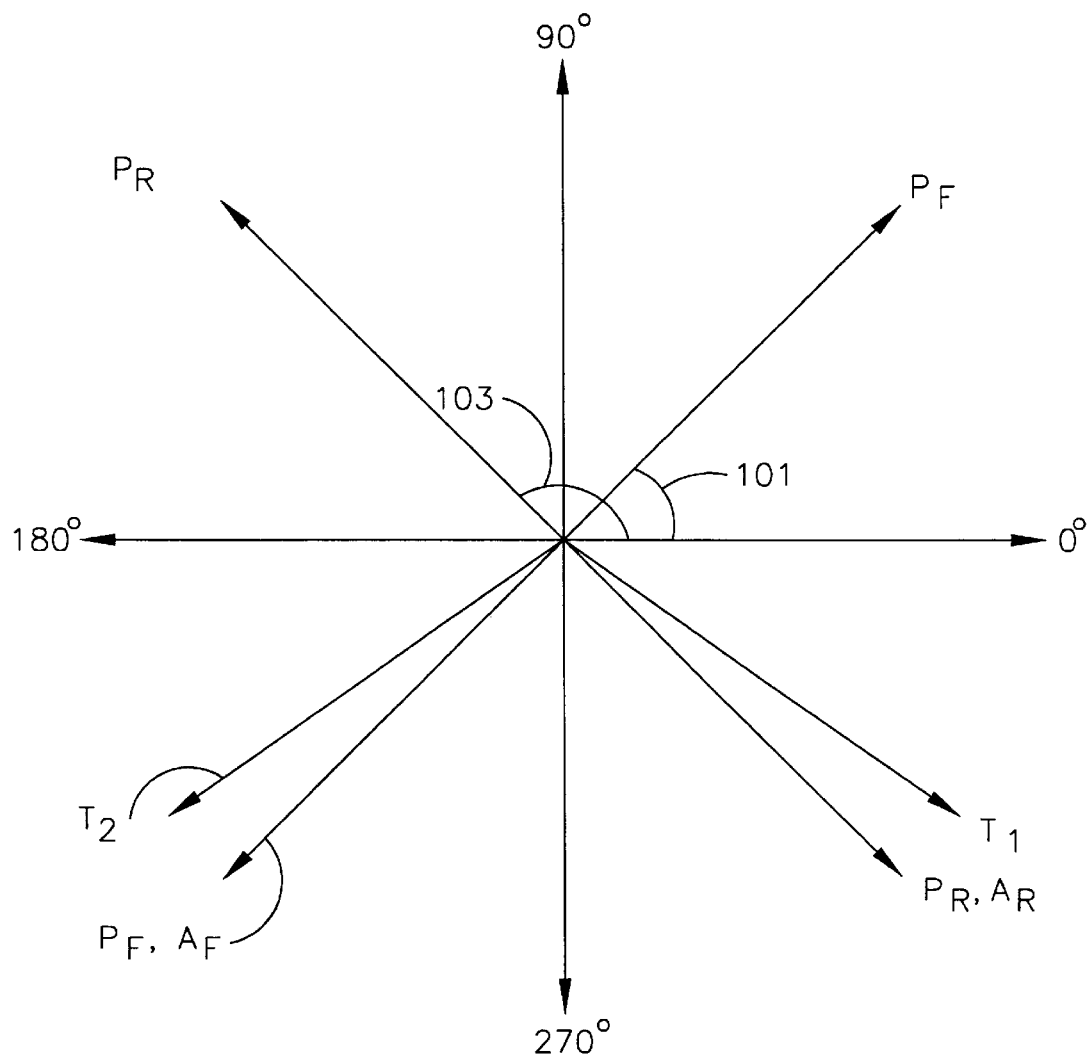
FIG. 2(b) illustrates the angular relationship between the azimuthal axes of the optical components of the FIG. 1(a)–1(e) embodiment, as viewed from the point of view of the viewer 1 (i.e. as viewed from the front of the display).

Important aspects of this invention which result in the improved viewing characteristics (better contrast and less inversion) disclosed herein include (i) the substantially parallel orientation (i.e. within ±10° from parallel in either direction) of the azimuthal angle φ aspect of optical axis $T_2$ of tilted retarder 6 relative to the transmission axis $P_F$ of the front polarizer as shown in FIGS. 1(a) and 2(b); (ii) each of the rear and front polarizers 5 and 15 having its transmission axis aligned parallel ±10° (i.e. substantially parallel) to the tilt sense alignment direction ($A_R$ or $A_F$) on the same side of the LC layer 10; (iii) each of tilted retarders 2 and 6 being oriented so that the side having the smallest tilt angle θ is closest to the LC layer 10 and the maximum tilt angle θ side is furthest from the LC layer 10 as shown in FIGS. 1(b) through 1(e); (iv) the substantial perpendicular orientation of optical axes $T_1$ and $T_2$ (with respect to azimuthal angle φ); (v) the substantial parallel (±about 10° from parallel in either direction) orientation of the azimuthal angle aspect of $T_1$ and rear LC tilt sense direction $A_R$ as shown in FIGS. 1(a) and 2(b); and (vi) direction $A_F$ being substantially parallel to the azimuthal φ angle aspect of optical axis $T_2$ of retarder 6 as shown in FIGS. 1(a) and 2(b).

The rear and front orientation or buffing films are each from about 250–500 Å thick, and may be made of a substantially transparent polyimide material as is known in the art. Directions $A_R$ and $A_F$ are oriented substantially perpendicular to one another so as to allow the molecules of nematic liquid crystal layer 10, when in the off or non-driven state, to be twisted from about 80° to 100°, preferably about 90° as known in the art. Also, it is pointed out that the tilted retarders of the instant invention may be used in conjunction with multi-domain [e.g. two-domain] alignment applications [the retarders may be patterned or otherwise provided in such embodiments].

Liquid crystal layer 10 has a thickness "d" of from about 3.5 to 6.5 $\mu$m according to certain embodiments, preferably from about 4.0 to 5.0 $\mu$m. LC layer 10 has a birefringent value $\Delta n$ of from about 0.08 to 0.10 according to certain embodiments, preferably from about 0.084 to 0.086 at room temperature.

Negative retarders 4 and 7 are preferably non-tilted and defined by either the characteristic $n_x > n_y > n_z$, or alternatively $n_x = n_y > n_z$, where $n_x$, $n_y$, and $n_z$ are respective indices of refraction, and the "z" direction is substantially perpendicular to the plane defined by the "x" and "y" index directions. Negative retarders 4 and 7 are either of the C-plate type (approximately $n_x = n_y > n_x$) or of the biaxial type (e.g. $n_x > n_y > n_z$, or $n_y > n_x > n_z$), and may be obtained from Nitto Denko America or Nitto Corporation (Japan), or alternatively from Fuji Photo Film Co., Ltd., Industrials and Products Division, Japan.

According to certain embodiments, the retarders and polarizers herein may all be separate sheets, although they alternatively may be all integrally formed or laminated together (or even deposited onto one another) with a known laminating material or deposition process according to certain embodiments. Thus, films 2, 4, and 5, for example, may be laminated or otherwise formed together to form a single sheet having negative tilted retarder 2, negative uniaxial or biaxial retarder 4, and rear polarizer 5. Likewise, films 6, 7, and 15 may be formed together as one unit or separately.

FIG. 2(a) is an optical diagram illustrating different angles associated with tilted retarders 2 and 6 herein. As illustrated, the x and y axes define a plane, and the z axis is perpendicular to that plane. FIG. 2(a) illustrates the embodiment herein where the non-tilted retarders 4 and 7 are laminated to or otherwise integrally formed immediately adjacent to tilted retarders 2 and 6. As shown in FIG. 2(a), TAC layer 4 (or 7) is immediately adjacent a corresponding tilted retarder 2 (or 6). The optical axis ($T_1$ or $T_2$) [and thus the $n_z$ direction] associated with each retarder 2, 6 extends substantially perpendicularly outward from a plane defined by the discotic molecular structure of each molecule within tilted retarders 2 and 6. As shown in FIG. 2(a), the $n_z$ direction for uniaxial TAC retarders may be in the normal direction, while in tilted retarders 2, 6 the $n_z$ direction (the same as the optical axis $T_1$ or $T_2$ direction) is tilted from the normal direction. Optical axes $T_1$ and $T_2$ point in the $n_z$ or $n_e$ index direction, and indices $n_x$ and $n_y$ define the plane of disc-like discotic molecules 8 in tilted retarders 2 and 6. Because the tilt angle of the molecules 8 within retarders 2 and 6 varies throughout the thickness of retarders 2 and 6, the incline $\theta$ of optical axes $T_1$ and $T_2$ also vary through the thicknesses of layers 2 and 6.

FIG. 2(a) defines azimuthal angle $\phi$ as well as tilt angles $\theta$ and $\beta$ as used herein with regard to tilted retarders 2 and 6. Azimuthal angle $\phi$ defines the orientation of optical axis $T_1$ or $T_2$ in the film plane when viewed by a hypothetical viewer located normal to the plane of the film (note that the plane of the film is not the same as the $n_x$, $n_y$ plane for tilted retarders 2 and 6, although these planes are effectively the same for non-titled uniaxial retarders 4 and 7). Meanwhile, angles $\theta$ and $\phi$ illustrate the varying tilt of the optical axis of a tilted retarder through its thickness. Tilt angle $\theta$ defines the tilt angle between the optical axis ($T_1$ or $T_2$) and the axis normal to the display, which is perpendicular to the plane of the film. Meanwhile, tilt angle $\beta$ defines the tilt angle defined between the optical axis ($T_1$ or $T_2$) and the plane of the film or retarder. In all embodiments herein, tilt angles $\beta$ and $\theta$ should add up to be 90°, because the axis normal to the display is perpendicular to the plane of the retarder film.

Still referring to FIG. 2(a), in this embodiment tilt angle $\theta$ in tilted retarder layer 2 (or 6) is smallest adjacent non-tilted retarder TAC layer 4 (or 7) [see also FIGS. 1(b) to 1(e)]. Tilt angle $\theta$ increases throughout the thickness of the tilted retarder as the molecules therein move further away from the adjacent TAC layer 4. Thus, tilt angle $\theta$ is largest on the surface of the tilted retarder 2 (or 6) furthest from TAC layer 4 (or 7). As will be appreciated by those of skill in the art, tilt angle $\beta$ is largest adjacent the adjacent TAC layer, and is smallest on the side of the tilted retarder furthest from the TAC layer and continually decreases therebetween through the thickness of the tilted retarder layer.

FIG. 2(b) illustrates the relationship between the FIG. 1(a) azimuthal axis directions parallel to the film planes, from the point of view of viewer 1. As shown in FIG. 2(b), transmission axis $P_F$ of front polarizer 15 is substantially perpendicular to axis $P_R$ of rear polarizer 5. In this particular embodiment, front polarizer axis $P_F$ is aligned at the 48° angle 101 while the rear polarizer axis $P_R$ is at the 138° angle 103. It should be understood that these angles are exemplary only, and that the front and rear polarizer axes may be aligned at different angles according to other embodiments of this invention, provided that the display is of the normally white type. Still referring to FIG. 2(b), direction $A_F$ is approximately perpendicular to direction $A_R$. In this particular embodiment, front direction $A_F$ is aligned at 225° while rear direction $A_R$ is at 315°.

With regard to tilted retarders 2 and 6, the azimuthal angle aspect $\phi$ of axis $T_1$ of retarder 2 is substantially perpendicular to the azimuthal angle aspect $\phi$ of axis $T_2$ of retarder 6. In this particular embodiment, $T_1$ azimuthal angle $\phi$ is aligned at about 313° while $T_2$ azimuthal angle $\phi$ is aligned at about 228°. According to the FIG. 2(b) embodiment, $P_F$, $A_F$, and $T_2$ (azimuthal) are substantially parallel to one another, while $P_R$, $A_R$, and $T_1$ (azimuthal) are also parallel to one another, ±approximately 10° (i.e. substantially parallel).

FIG. 3 is a side cross-sectional view of an NW twisted nematic LCD or LV of any of FIGS. 1–2. From the backlight forward, the display includes rear polarizer 5, negative tilted retarder 2, tilted or non-tilted negative retarder 4 (either uniaxial or biaxial), substantially transparent glass or plastic substrate 33, conductive transparent electrode(s) 34, rear buffing or orientation film 35, twisted nematic liquid crystal (LC) layer 10, front orientation or buffing film 36, front transparent conductive electrode(s) 37 which functions in conjunction with rear electrode(s) 34 in order to apply voltage across LC layer 10 and/or individual pixels or subpixels defined therein, front substantially transparent glass or plastic substrate 38, front tilted or non-tilted negative retarder 7 (either uniaxial or biaxial), front tilted negative retarder 6, and finally front polarizer 15. Thus, the incline or polar angle $\theta$ of the optical axis $T_1$ of retarder 2 may continuously vary, for example, from a maximum of 65° in the area of film 2 closest to polarizer 5, to 5° adjacent retarder layer 4. Thus, in this particular example, the plane of the discotic structure in negative tilted retarder 2 has a planar incline angle that is continuously reduced from a tilt of 60° or 65° to one of 5°, from the exterior side of layer 2 (i.e. the edge closest to polarizer 5) to the interior side of layer 2 (i.e. the side closest to LC layer 10). The other negative tilted retarder 6 has its polar or incline angle θ vary (continuously or intermittently) relative to LC layer 10 as shown in FIGS. 1(a)–1(e).

Exemplary variations of polar angles θ for each of tilted retarders 2 and 6 are: (i) from 65° to 5° going closer to LC layer 10; (ii) from 50° to 20° going closer to LC layer 10; (iii) from 70° to 20° going closer to LC layer 10; and (iv) from 40° to 20° going closer to LC layer 10. In certain preferred embodiments, the azimuthal angles φ of optical axes $T_1$ and $T_2$ remain substantially constant while the incline angles θ and β vary either continuously or intermittently as discussed above.

FIG. 4 is a side cross-sectional view of a TN NW LCD or LV according to another embodiment of this invention. This particular display is similar in structure to that of FIG. 3 discussed above, except that additional retarder layer 16 is also provided on the rear or front side of LC layer 10. Retarder 16 may be an A-plate, C-plate, or tilted retarder (uniaxial or biaxial). In certain embodiments, retarder 16 may be a negative A-plate retarder having a retardation value of from about −10 to −60 nm, and another similar negative A-plate retarder (with the same retardation value) may be provided on the opposite side of LC layer 10 in between substrate 38 and retarder 7.

According to certain embodiments of this invention, the retardation value d·($n_e$−$n_o$) of each of the two tilted negative retarders 2 and 6 is from about −20 to −200 nm, preferably about −50 nm to −150 nm, and most preferably from about −70 nm to −100 nm, and where $n_e$<$n_o$. In certain embodiments, $n_e$ is equal to $n_z$, and $n_o$ is equal to $n_x$ or $n_y$ because $n_x$ and $n_y$ are either equal to one another or differ from one another by less than about 0.5% (e.g. when $n_x$=1.57 and $n_y$=1.58) so that the retarders 2 and 6 are effectively uniaxial. Also, for each of tilted retarders 2 and 6, retardation values d·($n_z$−$n_x$) and d·($n_z$−$n_y$) are each from about −20 to −200 nm, preferably from about −50 to −150 nm, and most preferably from about −70 to −100 nm.

In combination with these average tilted retarder values, it has been found that excellent results are achieved when the d·($n_x$−$n_z$) birefringent value (retardation value) of each of negative retardation films 4 and 7 is from about 10 to 150 nm, more preferably from about 10 to 80 nm.

According to certain other embodiments, it has been found that improved viewing characteristics result when the retardation values of the tilted 2, 6 and preferably non-tilted negative 4, 7 retarders are maintained within a particular ratio range. The absolute value ratio of the average retardation values d·($n_e$−$n_o$) of each or one of negative tilted retarders 2 and 6 to the retardation value d·($n_x$−$n_z$) of each or one of retarders 4 and 7 is from about 1:1 to 3:1 (more preferably from about 1.0:1 to 2.0:1) according to certain embodiments. The retardation values of each of the like (e.g. tilted) retarders need not be identical, but the ratio range is often met by both sets of retardation values.

This invention will now be described with respect to certain examples as follows. In each of the examples set forth below, unless otherwise indicated, the liquid crystal layer had a Δn (or birefringent value) of 0.0854, the thickness "d" of LC layer 10 in each LV was substantially constant across the entire viewing area, the front and rear linear polarizers 5 and 15 were linear and each included both an iodined PVA layer and a TAC layer on each side of the PVA as known in the art, and the retarders 2, 4, 6, and 7 were all negative and present and located as shown in FIG. 1(a). All polarizers in actual units were NPF-G1220DUN. In each of the Examples retarders 2 and 4 were a single unit made up of a discotic liquid crystalline tilted retarder layer 2, a TAC negative uniaxial retarder layer 4, and an alignment layer therebetween, with the tilt or polar angle θ varying continuously as shown in FIG. 1(b). Layers 6 and 7 were similarly formed as one unit made up of a discotic LC tilted retarder layer 6, a TAC negative uniaxial retarder 7, and an alignment layer therebetween, oriented as shown in FIG. 1(d). For each example, negative tilted retarders 2 and 6 were essentially uniaxial (although slightly biaxial in theory) and were defined approximately by $n_x$=1.577, $n_y$=1.580, and $n_z$=1.538.

EXAMPLE 1

In this first Example, a normally white (NW) light valve (LV) was constructed as shown in FIGS. 1(a)–3. This light valve optically included, from the rear forward, rear polarizer 5 having a PVA layer and a pair of TAC layers [NPF-G1220DUN], rear tilted retarder 2, rear non-tilted negative uniaxial retarder 4 (TAC), TN LC layer 10, front non-tilted negative uniaxial retarder 7 (TAC), front tilted negative retarder 6, and finally front polarizer 15 [NPF-G1220DUN]. The thickness "d" of LC layer 10 was 4.75 μm and the Δn value of LC layer 10 was 0.0854. The incline or tilt angle θ of each of retarders 2 and 6 varied throughout the thickness of the layers from 60° on the side furthest from LC layer 10 down to approximately 3° on the side closest to liquid crystal layer 10. An alignment layer for the negative tilted retarder material was disposed between each tilted retarder 2 (or 6) and the adjacent non-tilted uniaxial TAC layer 4 (or 7). Each of non-tilted retarders 4 and 7 was TAC and about 100 μm thick and was defined approximately by $n_x$=$n_y$>$n_z$. Meanwhile, each of tilted retarders 2 and 6 were about 2.0 μm thick. Single units making up (i) layers 2, 4; and (ii) layers 6, 7 (including discotic LC alignment layer) were obtained from Fuji as its WV film.

Figure 5:
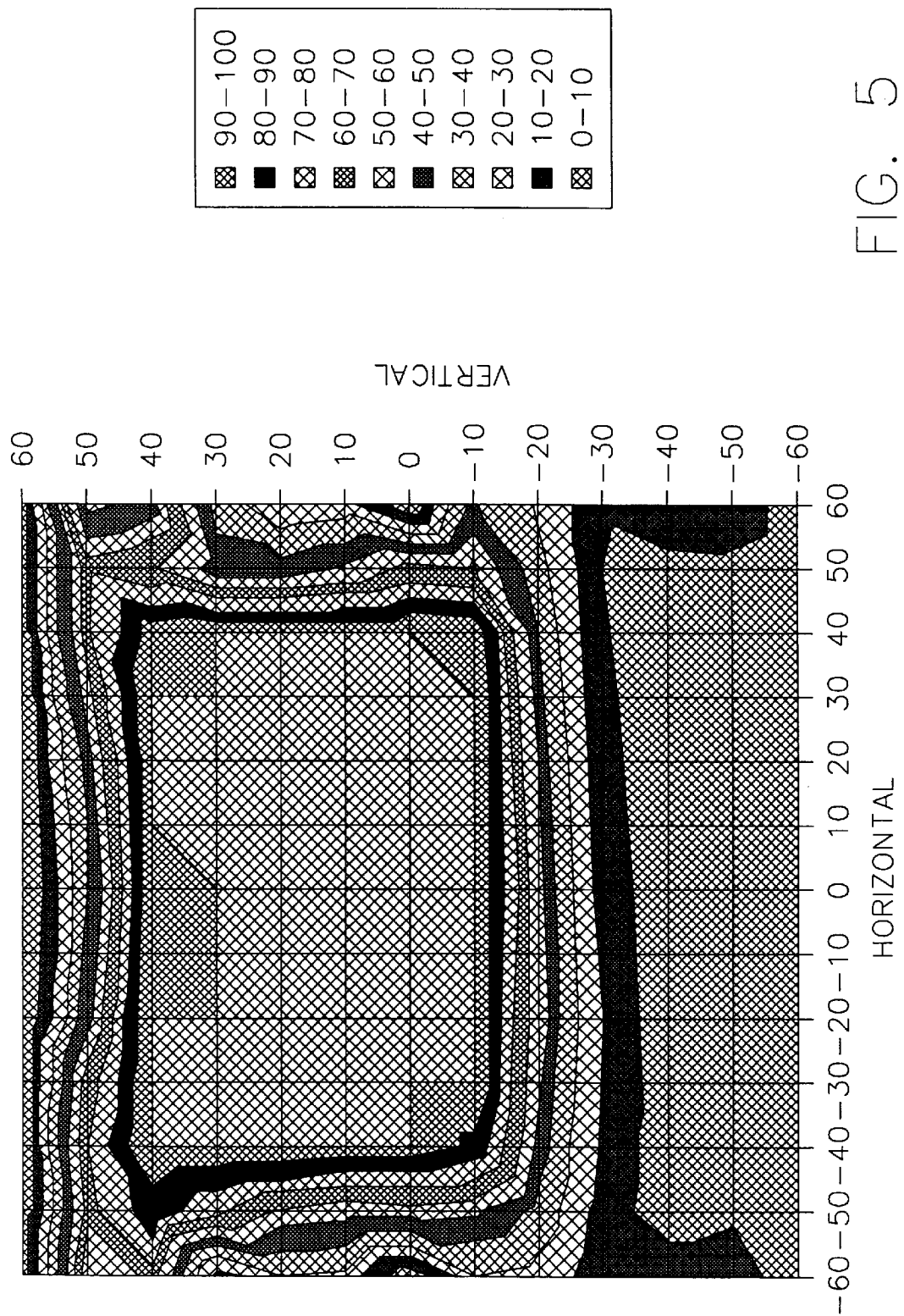
FIG. 5 is a measured white light contrast ratio contour graph (at 25° C.) of the NW TN light valve (LV) of Example 1 herein.

FIG. 5 is a white light contrast ratio graph of the LV of this first Example at 25° C., when 5.85 volts were applied in the on-state and 1.81 volts in the off-state. As illustrated, this LV exhibited good contrast throughout the entire viewing zone, especially in the positive vertical viewing areas. This LV exhibited contrast of at least about 30:1 over a horizontal angular span of at least about 120°.

Figure 6:
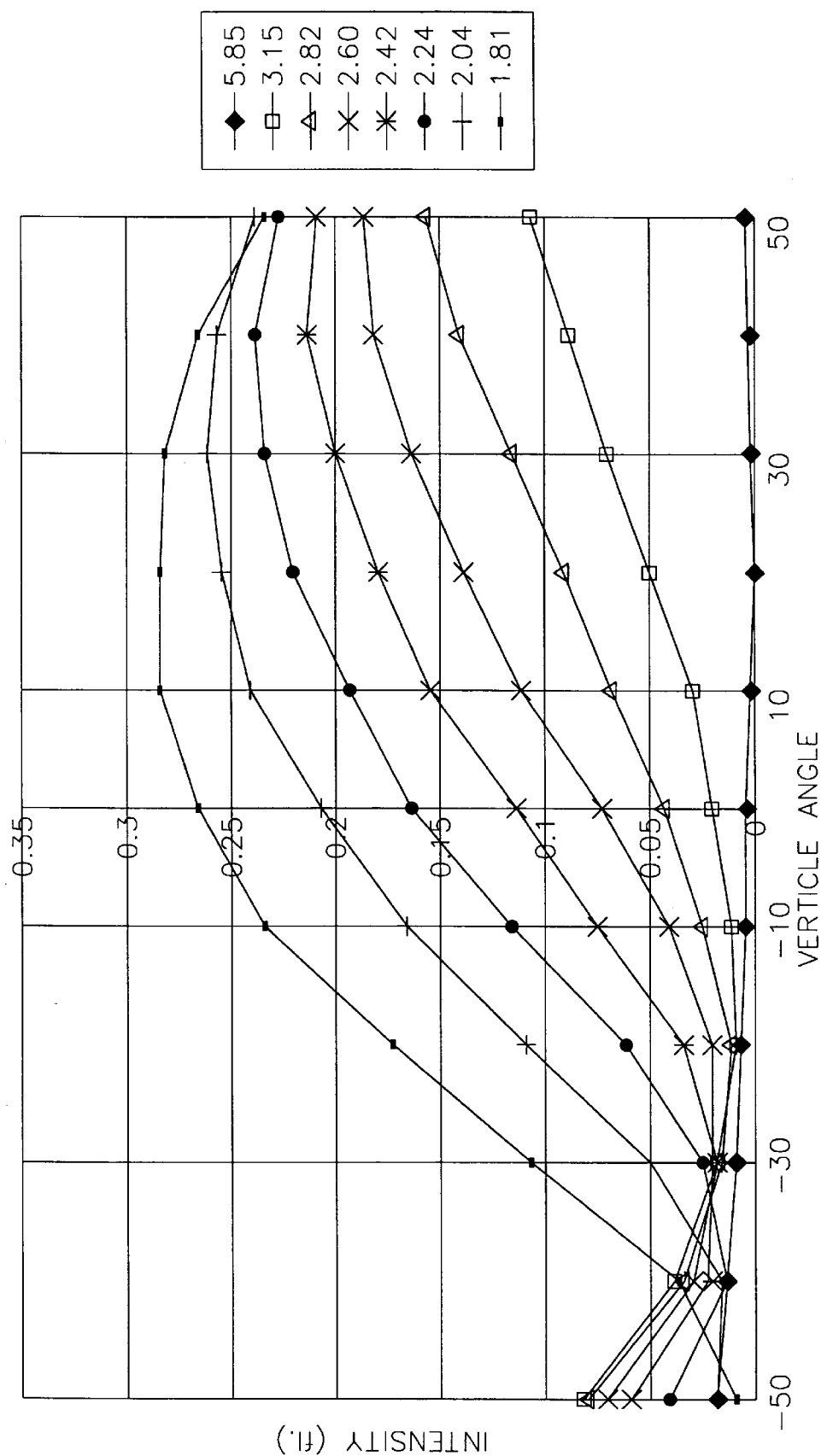
FIG. 6 is a measured intensity (fL) versus vertical viewing angle along the 0° horizontal viewing axis, for a plurality of driving voltages, for the light valve of Example 1 herein at 25° C., this graph illustrating, from about −20° to +50° vertical, virtually no gray scale inversion, good separation, each of which while maintaining high contrast shown in FIG. 5 in the viewing zone at issue.

FIG. 6 is an intensity (fL) versus vertical viewing angle plot (25° C.), at a plurality of different gray level driving voltages, for the LV of this first Example along the 0° horizontal viewing axis at a plurality of vertical viewing angles. As shown, there is virtually no gray scale inversion from −20° vertical all the way up to +50° vertical, and there is provided excellent separation of the gray scale voltages in this particular viewing zone. By adjusting the drive voltage of the brightest gray level to a higher voltage, the non-inversion region can be pushed to +60 degrees or more. This process of selecting gray level voltages to suit a particular application is known as harmonization.

Figure 7:
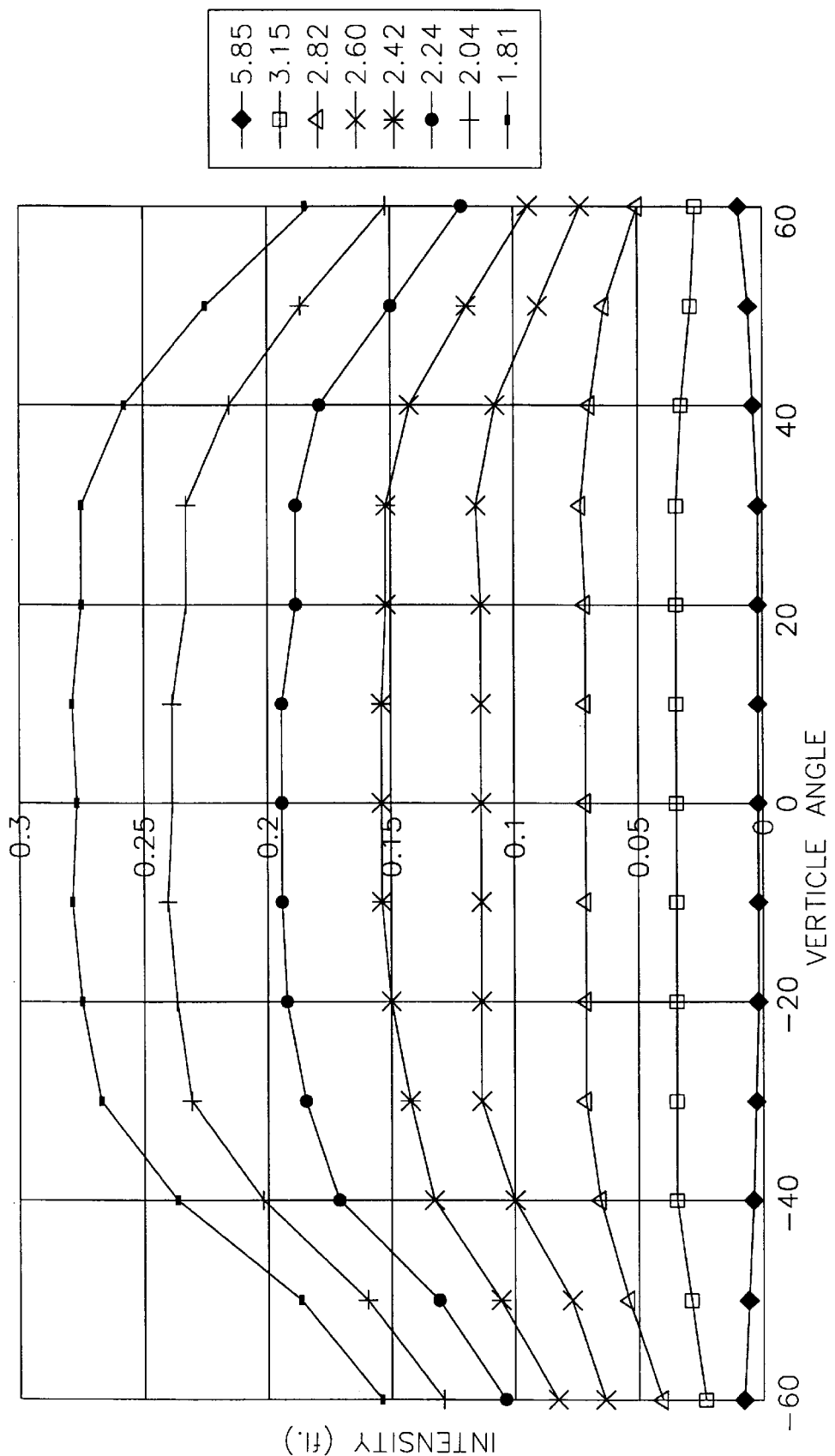
FIG. 7 is a measured intensity (fL) versus horizontal viewing angle graph (at 25° C.) along the 15° vertical viewing axis for a plurality of different driving voltages, for the light valve of Example 1 herein, this graph illustrating from −60° to +60° horizontal experiencing virtually no gray scale inversion and good separation, while maintaining high contrast as shown in FIG. 5.

FIG. 7 is an intensity (fL) versus horizontal viewing angle plot (25° C.), at a plurality of different gray level driving voltages, for the LV of this first Example along the 15° vertical viewing axis. As illustrated, from the horizontal viewing angles of −60° to +60°, there was excellent separation, and no crossovers (i.e. excellent gray scale inversion characteristics).

Figure 8:
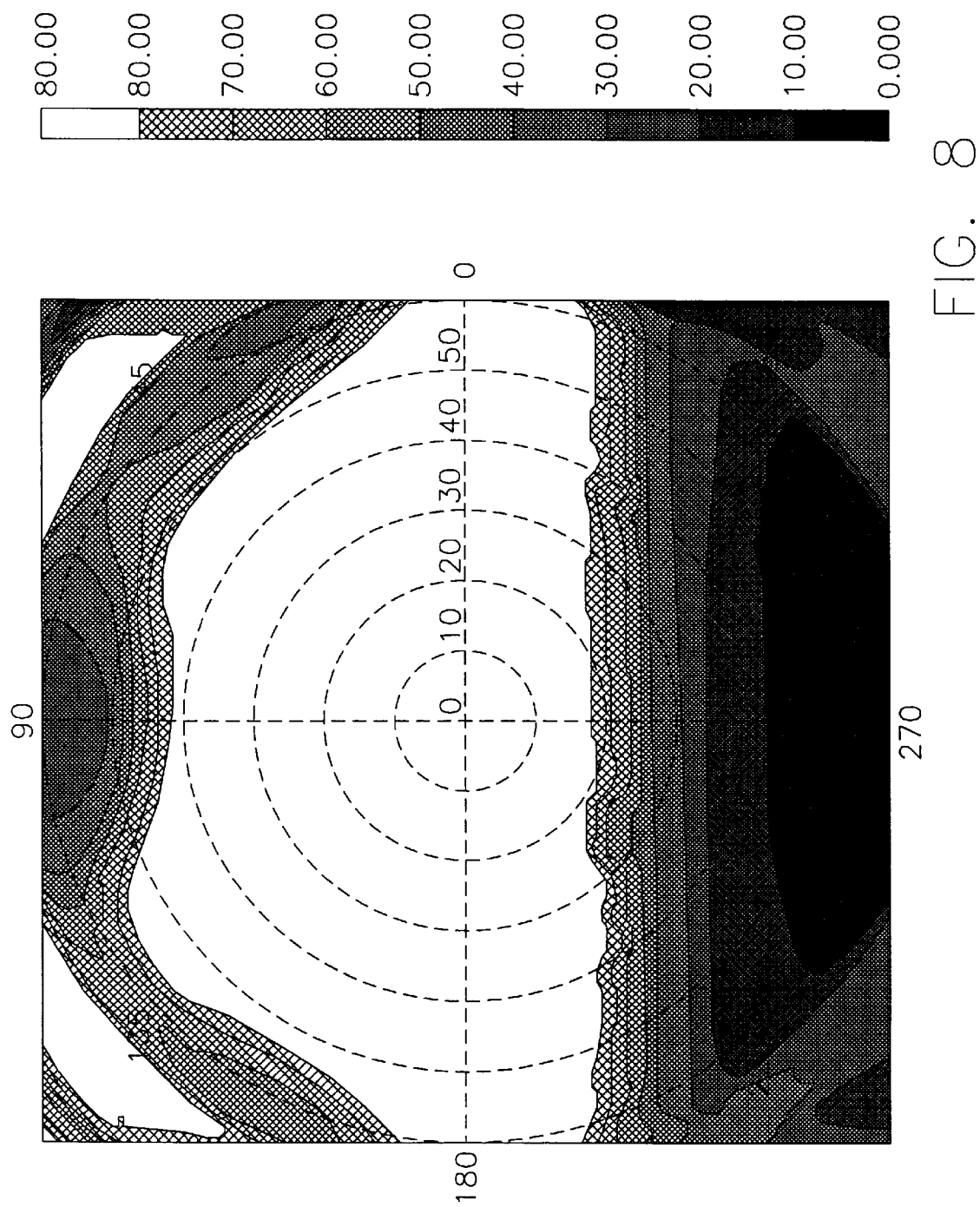
FIG. 8 is a measured white light contrast ratio contour graph of the NW TN LV of Example 1 herein at 50° C.

FIG. 8 is a white light contrast ratio graph of the light valve of Example 1, at 50° C. The maximum contrast ratio measured in the FIG. 8 graph was 429.07, while the minimum contrast ratio measured in the FIG. 8 graph was 2.48. As can be seen, this light valve portrayed excellent contrast ratio viewing characteristics.

Figure 9:
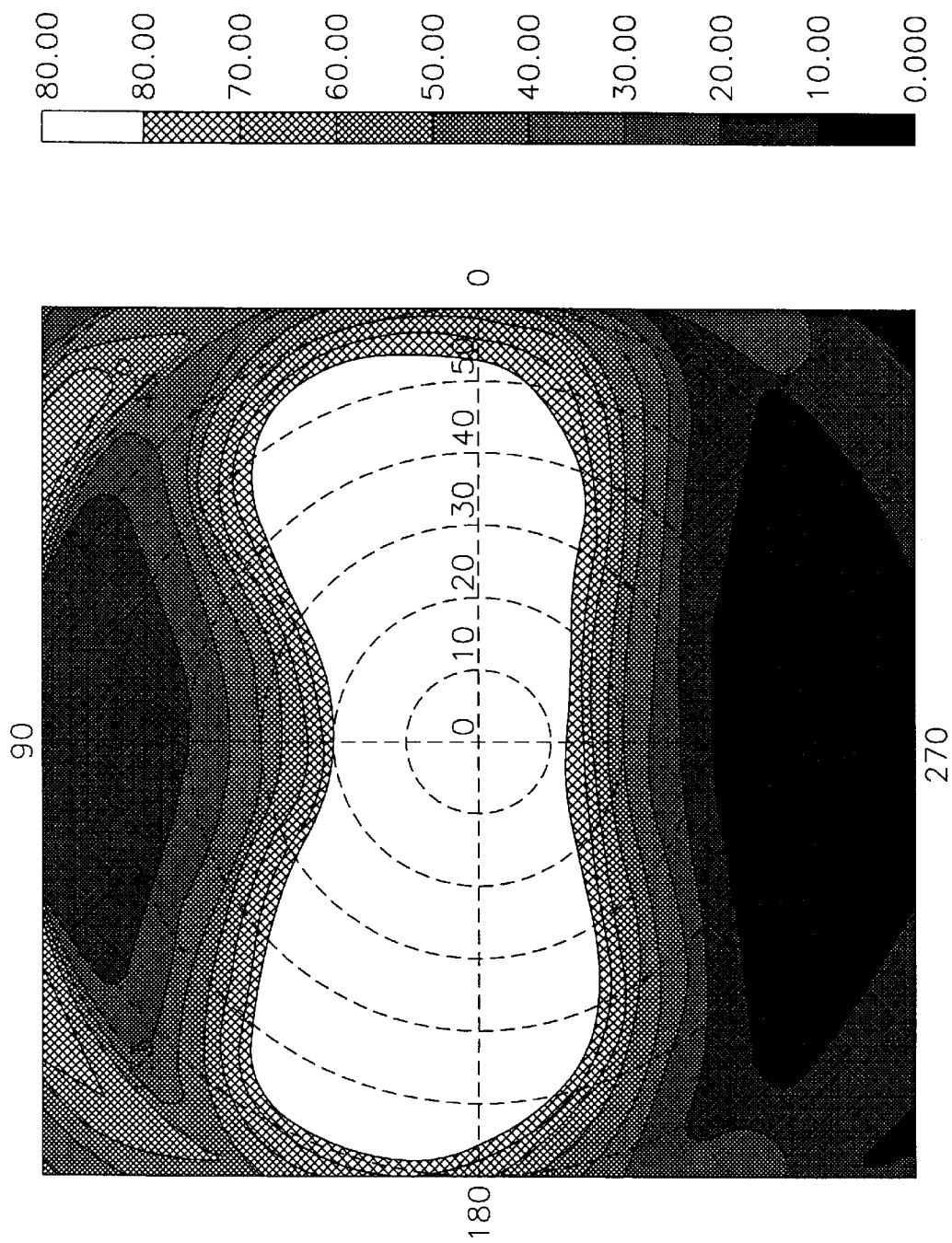
FIG. 9 is a measured white light contrast ratio graph of the Example 1 NW light valve at 70° C.

FIG. 9 is a white light contrast ratio graph of the light valve of Example 1, at 70° C. The maximum contrast ratio measured in the FIG. 9 graph was 402.24, while the minimum contrast ratio measured was 0.32. As can be seen in FIGS. 8 and 9, the orientation or configuration of the retarders in the Example 1 light valve (LV) rendered the light valve surprisingly resistant to temperature variation. In other words, the light valve displayed excellent viewing characteristics, including contrast ratio, over a wide range of temperatures.

EXAMPLE 2

In this second Example, an NW TN LV having an LC thickness of 4.70 μm was simulated based upon algorithms which may be found in SID 1991, pages 586–589, entitled "Application Of The Extended Jones Matrix Method To LCDs At The Oblique Incidence", by A. Lien. This simulated NW TN LV is fairly represented by FIGS. 1–3 herein. From the rear forward, this LV optically included rear polarizer 5, negative discotic liquid crystalline tilted retarder 2, negative uniaxial retarder 4 (TAC), a rear orientation film, TN liquid crystal layer 10, a front orientation film, front non-tilted TAC negative uniaxial retarder 7, front negative tilted discotic liquid crystalline retarder 6, and front linear polarizer 15. The Δn of the LC layer was 0.0854. Each of tilted retarders 2 and 6, was about 2.0 μm thick. Each of negative approximately uniaxial TAC non-tilted retarders 4 and 7 had a d·$(n_x-n_z)$ value of from about 10–80 nm, and a thickness "d" of about 100 μm. Regarding each of tilted retarders 2 and 6, the tilt angle θ continuously varied from 60° on the side furthest from LC layer 10 down to 3° on the side closest to LC layer 10. Azimuthal aspect φ for each axis $T_1$ and $T_2$ remained approximately constant through the tilted retarder layer.

Figure 10:
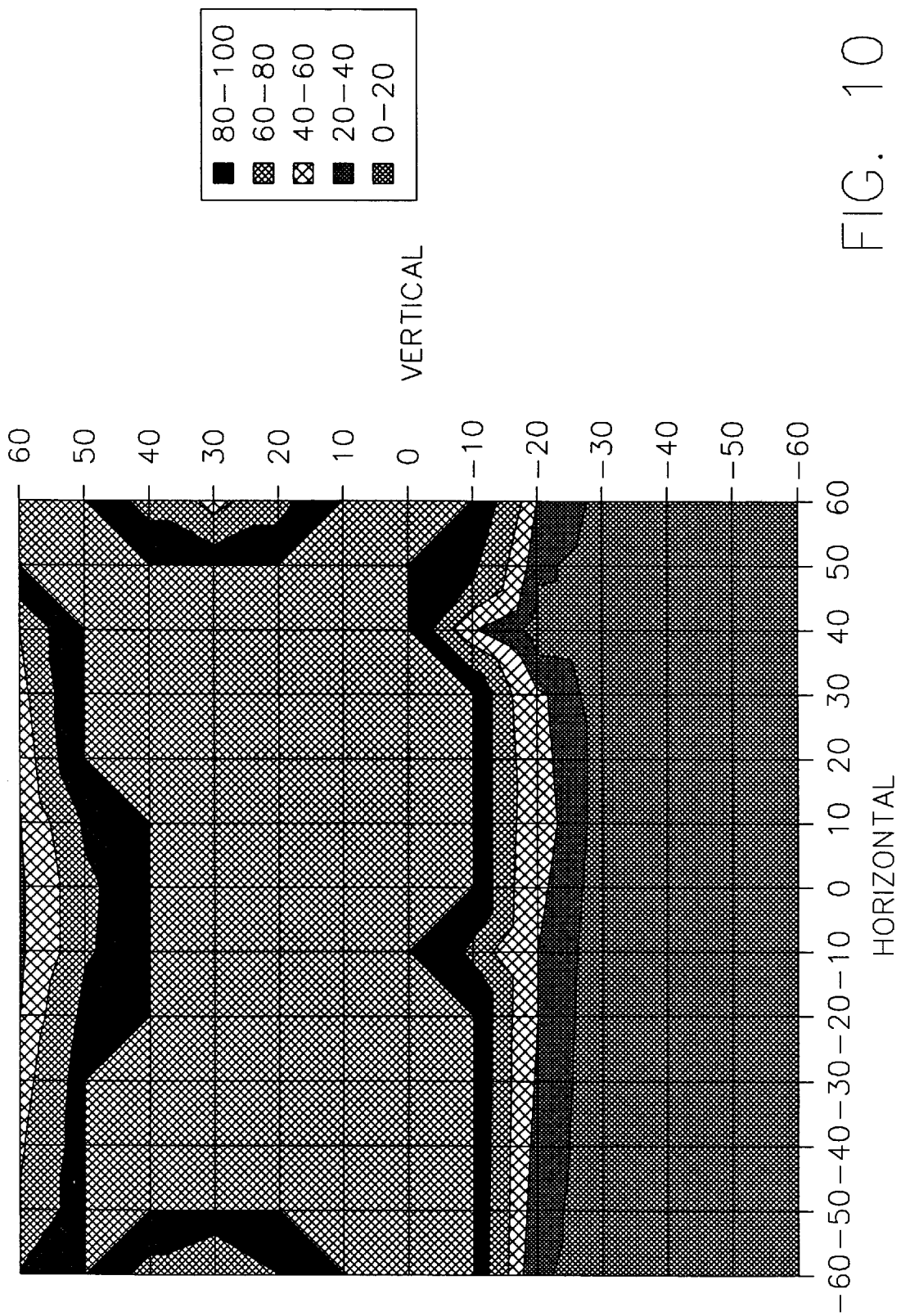
FIG. 10 is a contrast ratio graph of the simulated NW TN LV LCD of Example 2 herein, with an off-state driving voltage of 1.6 volts and an on-state driving voltage of 5.6 volts, and an LC thickness of 4.7 μm.

FIG. 10 is a contrast ratio of the LV of this Example at 25° C. when 5.6 volts were applied in the on-state and 1.6 volts in the off-state. As illustrated, excellent contrast resulted with the LV exhibiting contrast of at least 60:1 over a horizontal viewing range or extent of 120°. Furthermore, the LV of this Example exhibited contrast of at least 100:1 over a horizontal span of at least 120°, and a contrast of at least 40:1 over a vertical span of at least about 80°.

Figure 11:
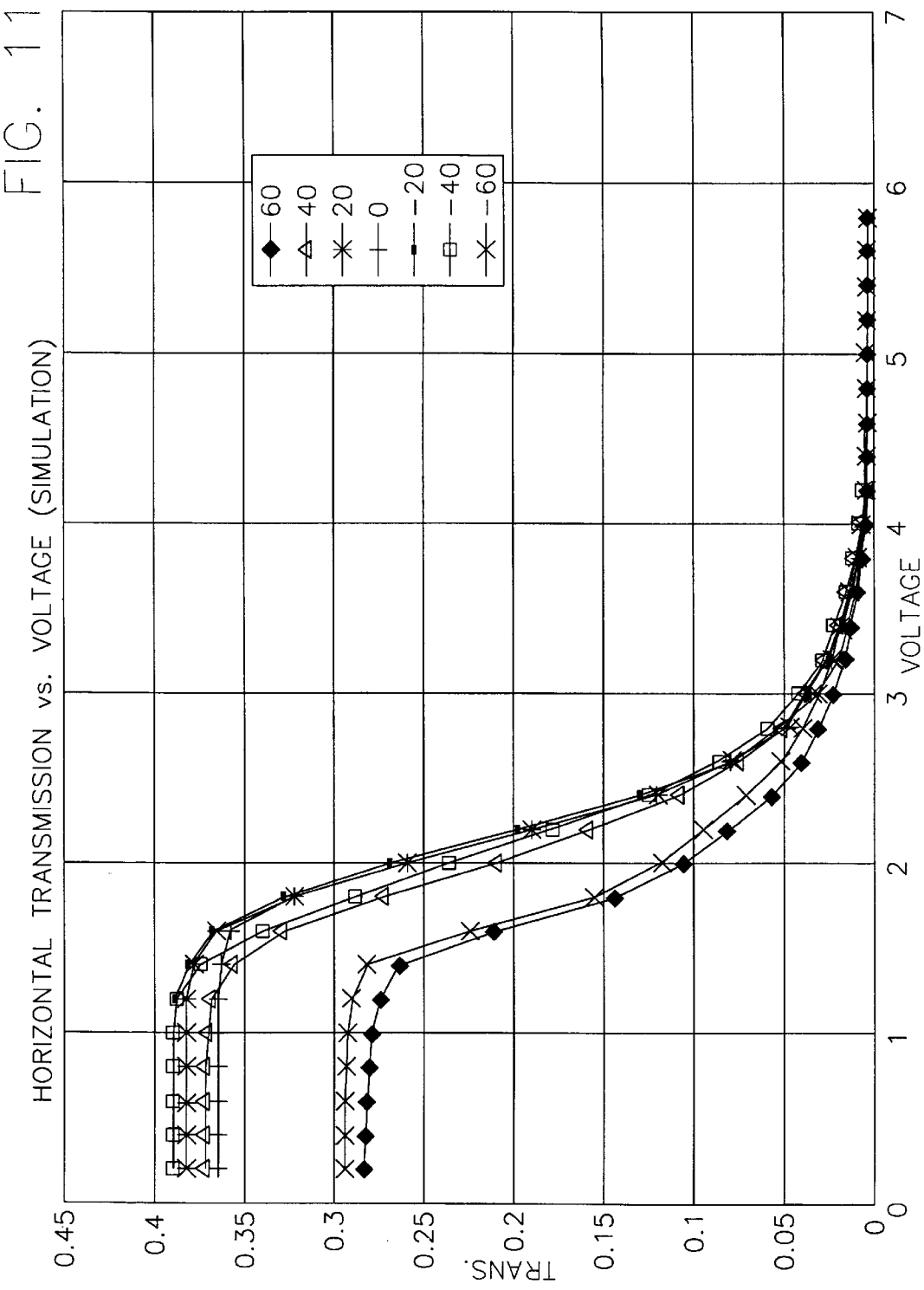
FIG. 11 is a simulated horizontal transmission vs. driving voltage graph of the Example 2 light valve, at the 0° vertical viewing angle.

FIG. 11 is a horizontal transmission vs. voltage plot at the 0° vertical viewing angle, for a plurality of different voltages and different horizontal viewing angles, for this LV of Example 2. As can be seen, there was virtually no gray scale inversion.

Figure 12:
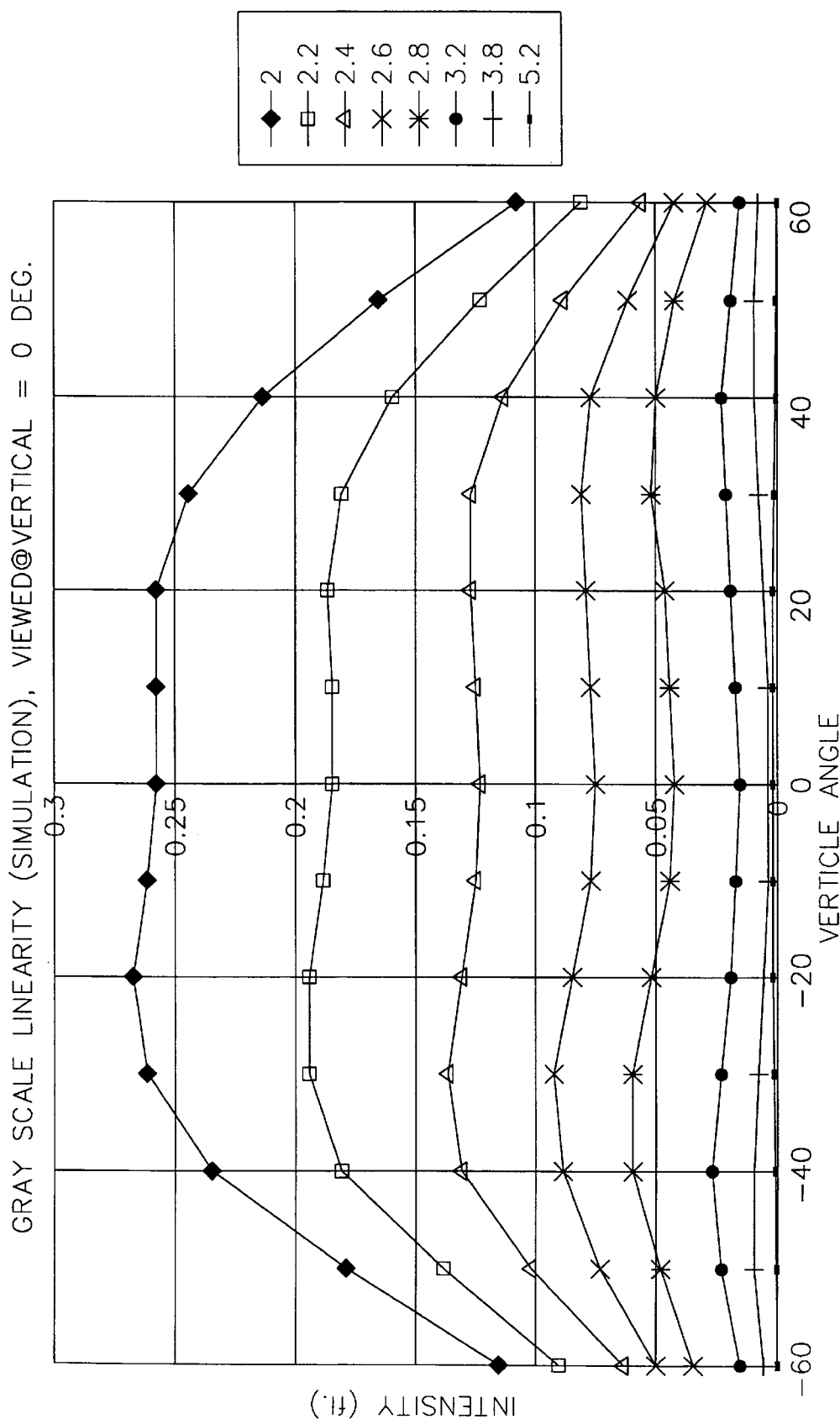
FIG. 12 is a gray scale linearity graph, at 0° vertical, of the Example 2 light valve.

FIG. 12 is a gray scale linearity (at 0° vertical) plot of the LV of this second Example, for a plurality of different driving voltages, at a plurality of different horizontal angles (horizontal axis of graph) at the 0° vertical viewing axis. Again, excellent separation and inversion characteristics are illustrated.

Figure 13:
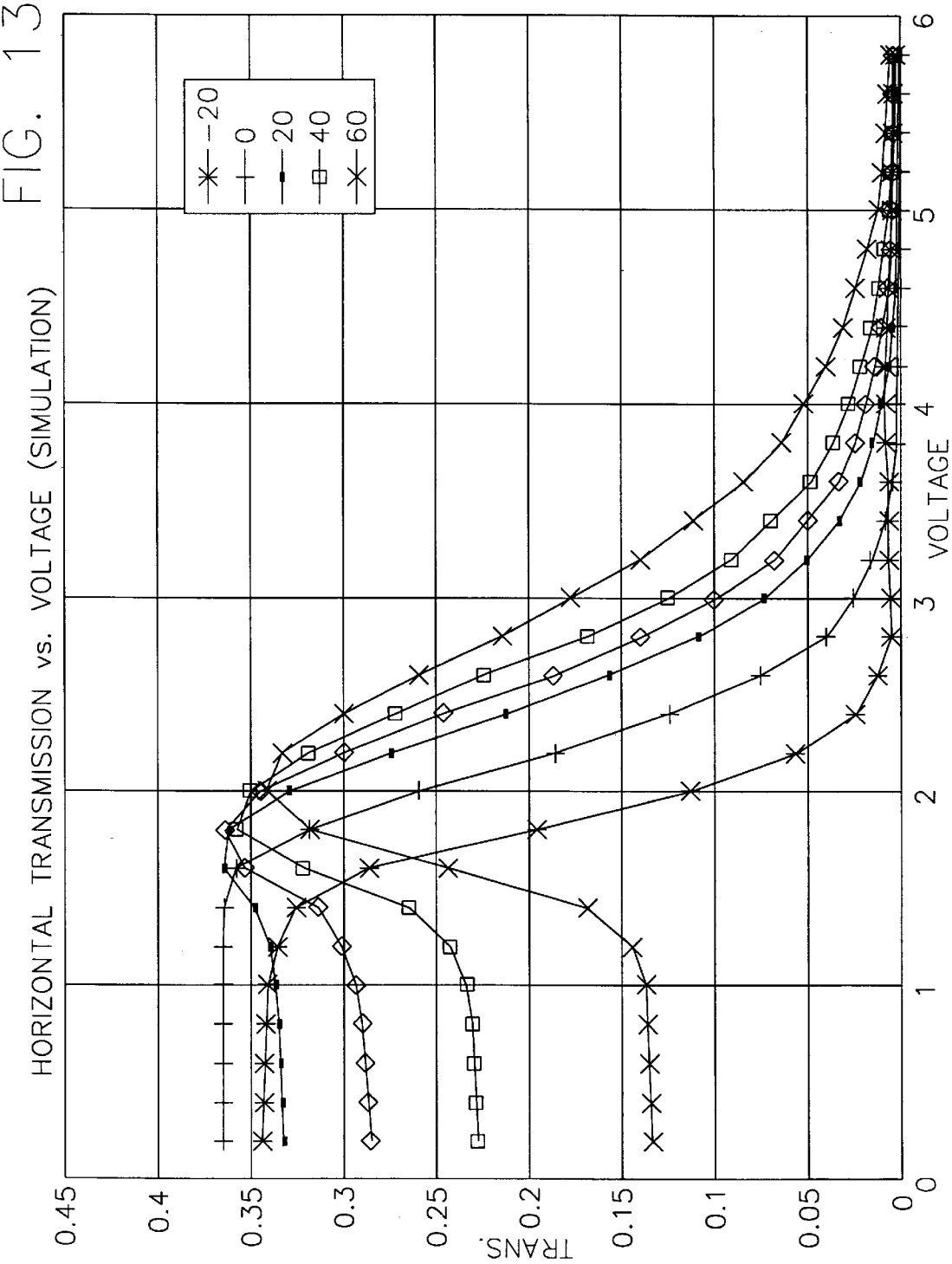
FIG. 13 is a vertical viewing angle transmission vs. driving voltage graph, of the Example 2 simulated light valve, at the 0° horizontal viewing angle.

FIG. 13 is a transmission versus voltage plot for a plurality of different vertical viewing angles for the LV of Example 2, at the 0° horizontal viewing angle. As shown, this display exhibited excellent gray scale behavior with regard to both separation and inversion. This concludes the discussion of the examples herein.

Figure 14:
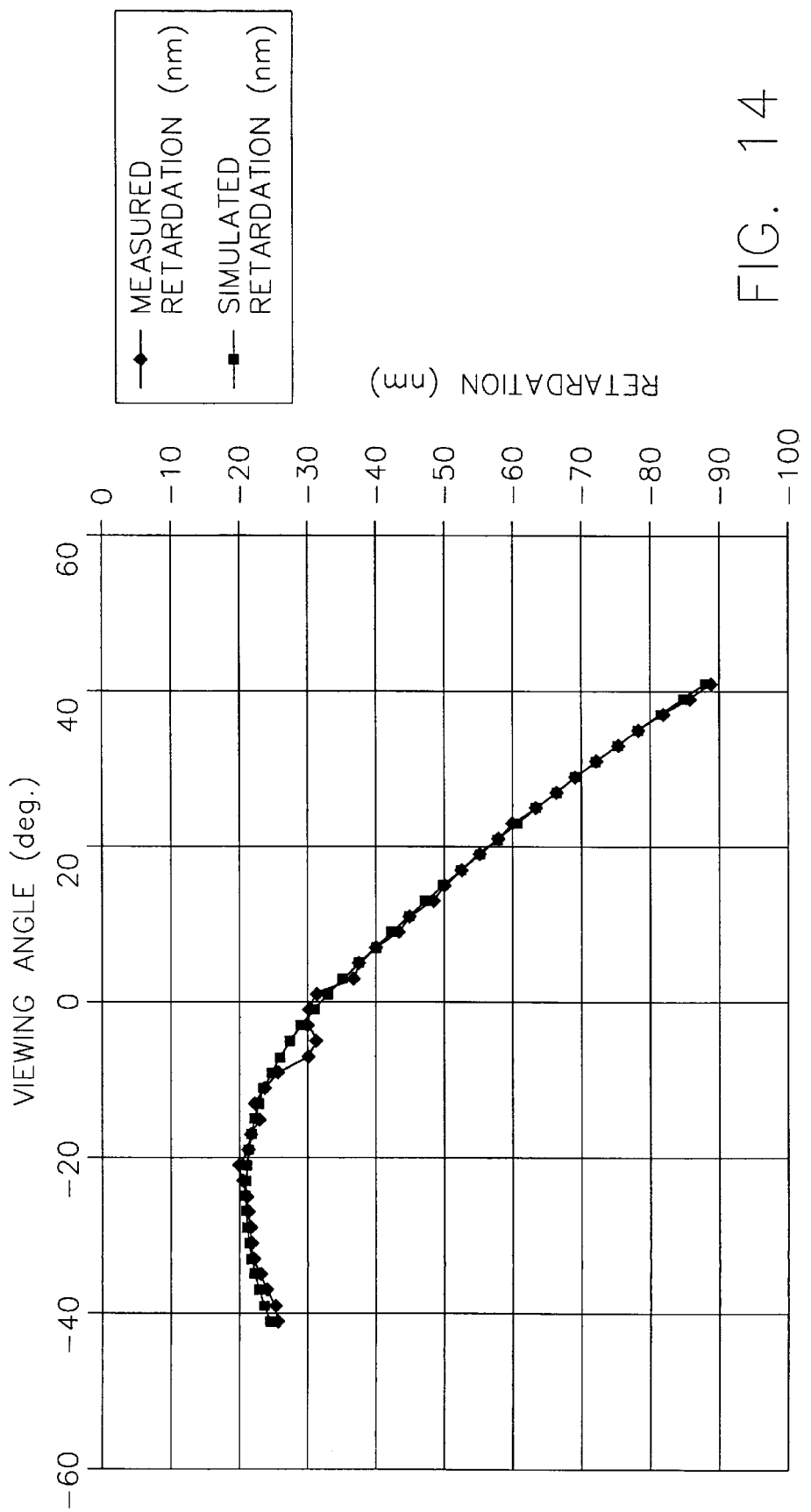
FIG. 14 is a viewing angle vs. retardation (nm) graph, showing both simulated and measured results, of tilted retarder systems herein.

FIG. 14 is a viewing angle (horizontal axis of graph) vs. retardation (vertical axis of graph) [nm] plot of retardation layer systems herein made up of both a negative tilted layer (2 or 6) and an adjacent non-tilted TAC negative retarder layer (4 or 7) [Fuji WV film]. As with all other embodiments herein, an alignment layer is typically provided between the adjacent tilted retarder (2 or 6) and the non-tilted negative uniaxial or biaxial retarder (4 or 7). In previous embodiments, the "retardation value" of retarders herein (and unless otherwise specified) was a function of the retarder's thickness "d" [with "d" being measured in a direction normal to the display plane] multiplied by a difference in refractive index (e.g. $n_e-n_o$). While this aforesaid method of determining retardation value is accepted throughout the industry, and is typically regarded as the way in which to do so, it is problematic in some instances because it does not take viewing angle into consideration. For instance, the thickness "d" of a retardation or optical compensating layer varies as a function of viewing angle. If one were viewing a layer from a point normal to that layer, the viewed thickness of the layer would be the least possible thickness for the layer. If, however, a viewer were to view a layer from a point 30° angled from the normal axis, then the viewing thickness "d" would be much thicker because light proceeding through the layer and reaching the viewer would not be traveling straight through the layer, but instead would be traveling at a 30° angle diagonally through the layer thereby increasing the effective thickness of the retardation layer for the 30° off-axis viewing angle. In such a manner, the thickness of a retardation layer varies as a function of viewing angle.

The Δn value (e.g. $n_e-n_o$) of a retardation layer also varies as a function of viewing angle. For example, theoretically, at a normal viewing angle (at a viewing angle perpendicular to the plane of the retarder layer) $n_e$ is equal to $n_o$ for certain types of retarder. Thus, the retardation for these types of retarders would be zero at this "normal" viewing angle, and different at other viewing angles.

In view of the above, the graph of FIG. 14 uses the following equation to determine retardation value of a retardation system including e.g. retarders 2 and 4 as a function of viewing angle: R( )=[$n_e$( )−$n_o$]·d ( ), where "d" is the thickness of the retardation layer or layer system taking viewing angle into consideration, " " is the viewing angle relative to the normal viewing direction at which the viewer is looking at the retardation layer, and "R ( )" is the retardation value (nm) of the layer system as a function of viewing angle. As can be seen in FIG. 14, the average retardation value of a retarder made up of a tilted layer 2 (or 6) and a non-tilted TAC layer 4 (or 7) was approximately −34 nm. Also, the lowest retardation value was measured at a viewing angle of approximately −33°. This is because the average tilt angle θ of the tilted retardation layer was approximately 33°±3°. In other words, the peak of the retardation value curve of FIG. 14 is found proximate the average tilt value θ of the retarder system.

With regard to FIG. 14, it is noted that the viewing angles in the horizontal axis were determined as follows. At 0°, a sampling and measuring laser beam was striking the retarder system from a direction normal to the plane thereof, and at the peak of the curve (i.e. at about 33°±3°) the laser beam is striking the retarder in a direction approximately parallel to the average retarder optical axis direction [e.g. see FIG. 2(*a*) for three dimensional optical axis directions]. A pair of the FIG. 14 retarder systems may be provided in an LCD according to certain embodiments of this invention.

Still referring to FIG. 14, the retardation value R(α) [in nm] curves from the peak downward from about 30–35 nm over about 40 degrees in viewing angle change; and the retardation value slopes downward 50 nm over a viewing angle change of from about 40–60 degrees, and preferably slopes downward 50 nm over a viewing angle change of from about 45–55 degrees. Additionally, as shown in FIG. 14, each retardation system herein (e.g. retarders 2, 4) defines a retardation value R(α) in nanometers (nm) which curves from a peak downward from about 25 to 40 nm over a span of about 40 degrees in change in viewing angle.

Once given the above disclosure, many other features, modifications, and improvements will become apparent to the skilled artisan. Such other features, modifications, and improvements are therefore considered to be a part of this invention, the scope of which is to be determined by the following claims.

We claim:

1. A normally white twisted nematic liquid crystal display (LCD) comprising:
    a twisted nematic liquid crystal layer for twisting at least one normally incident wavelength of visible light from about 80°–100° when in the off-state;
    front and rear orientation layers sandwiching said liquid crystal layer therebetween, said front orientation layer causing a front liquid crystal tilt sense direction $A_F$ and said rear orientation layer causing a rear liquid crystal tilt sense direction $A_R$ different than said direction $A_F$;
    rear and front tilted retardation layers located on opposite sides of said liquid crystal layer;
    each of said rear and front tilted retardation layers having an optical axis defining an azimuthal angle φ, and a polar or inclined tilt angle θ which varies through the thickness of the layer; and
    wherein said azimuthal angle aspect φ of an optical axis of said rear tilted retardation layer is oriented parallel ±10° relative to said rear tilt sense direction $A_R$ of liquid crystal molecules proximate said rear orientation layer, and said azimuthal angle aspect φ of an optical axis of said front tilted retardation layer is oriented parallel ±10° relative to said front tilt sense direction $A_F$ of liquid crystal molecules proximate said front orientation layer; and
    wherein each of said rear and front tilted retardation layers includes a tilt angle θ which is substantially greater on the side of the tilted retardation layer furthest from said liquid crystal layer than on the side closest to said liquid crystal layer.

2. The LCD of claim 1, further comprising first and second negative non-tilted retardation layers on opposite sides of said liquid crystal layer, each of said first and second negative non-tilted retardation layers being defined by one of: (i) $n_x > n_y > n_z$; and (ii) $n_x = n_y > n_z$ and wherein each of said negative non-tilted retardation layers has a retardation value $d \cdot (n_x - n_z)$ of from about 10 to 150 nm.

3. The LCD of claim 2, wherein each of said rear and front tilted retardation layers has a negative birefringence and a retardation value $d \cdot (n_e - n_o)$ of from about –20 to –200 nm, and for each of said tilted retardation layers, $n_x$ and $n_y$ differ from one another by less than about 0.5%.

4. A normally white twisted nematic liquid crystal display comprising:
    a nematic liquid crystal layer for twisting at least one normally incident visible wavelength of light as it passes therethrough when said liquid crystal layer is in substantially the off-state so as to define a twisted nematic normally white display;
    first and second non-tilted negative retarder layers located on opposite sides of said liquid crystal layer and each having a retardation value $d \cdot (n_x - n_z)$ of from about 10 nm to 150 nm and a retardation value $d \cdot (n_x - n_y)$ of from about –20 nm to 20 nm;
    rear and front polarizers, each having a different transmission axis;
    first and second negative tilted retarder layers located on opposite sides of said liquid crystal layer, each of said first and second tilted retarder layers having a retardation value $d \cdot (n_z - n_x)$ of from about –20 to –200 nm; and
    wherein each of said tilted retarder layers includes a tilt angle θ which varies throughout the thickness of the respective layer, and wherein said tilt angle θ for each tilted retarder layer varies from a first value of from about 45°–70° furthest from said nematic liquid crystal layer and a second value of from about 1°–10° on the side of the respective tilted retarder closest to said nematic liquid crystal layer.

5. The display of claim 4, wherein each of said first and second negative tilted retarder layers has a retardation value $d \cdot (n_z - n_x)$ of from about –15 nm to –150 nm, and wherein each of said first and second negative tilted retarder layers has a retardation value $d \cdot (n_z - n_y)$ of from about –50 nm to –150 nm.

6. The display of claim 5, wherein each of said first and second negative tilted retarder layers has a retardation value $d \cdot (nz-nx)$ of from about –70 nm to –100 nm.

7. The display of claim 4, wherein each of said first and second negative tilted retarder layers includes a discotic liquid crystalline material, and wherein each of said first and second non-tilted negative retarder layers includes triacetyl cellulose (TAC), and wherein each of said first and second non-tilted negative retarder layers is from about 80–140 μm thick.

8. The display of claim 4, wherein said first and second non-tilted negative retarder layers and said first and second negative tilted retarder layers are positioned and oriented relative to one another so that the display outputs a contrast ratio of at least about 30:1 over a horizontal angular span of at least about 120°.

9. The display of claim 8, wherein said first and second non-tilted retarder layers and said first and second tilted retarder layers are oriented relative to one another so that the display outputs a contrast ratio of at least about 60:1 over a horizontal angular span of at least about 120°, and over a vertical angular span of at least about 50°.

10. The display of claim 9, wherein said first and second non-tilted retarder layers and said first and second tilted retarder layers are oriented relative to one another so that the display outputs a contrast ratio of at least about 80:1 over a horizontal angular span of at least about 120° and over a vertical angular span of at least about 60°.

11. A normally white liquid crystal display comprising:
    a nematic liquid crystal layer;
    first and second electrodes sandwiching said liquid crystal layer therebetween and selectively applying voltage across said nematic liquid crystal layer;
    first and second negative retardation systems located on opposite sides of said nematic liquid crystal layer, wherein each of said first and second negative retardation systems includes at least one negative tilted retarder and wherein each of said two negative tilted retarders includes a tilt angle θ that increases through the thickness of the negative tilted retarder and becomes greater as the thickness of the negative tilted retarder becomes further from said nematic liquid crystal layer; and wherein each of said first and second negative retardation systems defines a retardation value R(α) in nanometers (nm) which curves from a peak downward from about 25 to 40 nm over a span of about 40 degrees in change in viewing angle.

12. The display of claim 11, wherein said about 40 degrees span is from a viewing angle of from about −20 to +20 degrees, and wherein said retardation value is defined by $R(\alpha)=[n_e(\alpha)-n_o]\cdot d(\alpha)$, where "$d(\alpha)$" is the thickness of the retardation system as a function of viewing angle α, $n_e$ is equal to $n_z$, $R(\alpha)$ is the retardation value in nm of the system as a function of viewing angle, and $n_o$ is equal to one of $n_x$ and $n_y$.

13. The display of claim 11, wherein each of said retardation systems further includes a negative non-tilted retarder layer which is one of uniaxial and biaxial.

14. The display of claim 11, wherein said retardation value curves from the peak downward from about 30–35 nm over said 40 degrees in viewing angle.

15. The display of claim 11, wherein said retardation value slopes downward 50 nm over a viewing angle change of from about 40–60 degrees.

16. The display of claim 15, wherein said retardation value slopes downward 50 nm over a viewing angle change of from about 45–55 degrees.

* * * * *